（12） United States Patent
Aida et al.

(10) Patent No.: US 6,235,099 B1
(45) Date of Patent: *May 22, 2001

(54) INKJET RECORDING LIQUID AND PROCESS FOR THE PRODUCTION THEREOF

(75) Inventors: Seiji Aida; Tsutomu Fujigamori; Hisashi Uraki; Ichiro Toyoda; Sunao Satake; Seiji Sawada; Yasuharu Iida, all of Tokyo (JP)

(73) Assignee: Toyo Ink Manufacturing Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/527,702

(22) Filed: Jul. 28, 1997

Related U.S. Application Data

(63) Continuation-in-part of application No. 08/714,129, filed as application No. PCT/JP96/00147 on Jan. 26, 1996, now Pat. No. 5,716,435.

(30) Foreign Application Priority Data

Jan. 27, 1995 (JP) .................................................. 7-11501
Jan. 27, 1995 (JP) .................................................. 7-11502
Jan. 27, 1995 (JP) .................................................. 7-11503
Sep. 18, 1995 (JP) ................................................ 7-238161

(51) Int. Cl.$^7$ .................................................. C09D 11/02
(52) U.S. Cl. ...................................... 106/31.65; 106/31.75; 106/31.85; 106/412; 106/493; 106/496; 106/497
(58) Field of Search ............................ 106/31.65, 31.73, 106/31.75, 31.85, 412, 493, 496, 497

(56) References Cited

U.S. PATENT DOCUMENTS

| 3,074,950 | * | 1/1963 | Deuschel et al. | 106/497 |
| 3,891,455 | * | 6/1975 | Langley et al. | 106/411 |
| 3,954,795 | * | 5/1976 | Jackson | 540/141 |
| 4,257,951 | * | 3/1981 | Matrick | 106/412 |
| 4,298,399 | * | 11/1981 | Formica et al. | 106/413 |
| 5,281,268 | * | 1/1994 | Ide et al. | 106/410 |
| 5,310,778 | * | 5/1994 | Shor et al. | 106/31.65 |
| 5,476,544 | * | 12/1995 | Endo et al. | 106/499 |
| 5,716,435 | * | 2/1998 | Aida et al. | 106/31.85 |

* cited by examiner

Primary Examiner—Helene Klemanski
(74) Attorney, Agent, or Firm—Wenderoth, Lind & Ponack, L.L.P.

(57) ABSTRACT

A water-dispersed inkjet recording liquid excellent in water resistance and transparency and also excellent in the property of ejection from a nozzle, containing, as a colorant, a water-based dispersion of an organic pigment (A) which is at least one member selected from the group consisting of a quinacridone pigment, a benzimidazolone pigment, an insoluble azo pigment, a fuzed azo pigment, a quinophthalone pigment, a naphthol pigment, a perylene pigment and an isoindolinone pigment and has an average particle diameter of 10 to 150 nm (measured by laser scattering), the water-based dispersion of the organic pigment (A) being obtained by mechanically kneading a mixture containing at least three components of the organic pigment (A), a water-soluble inorganic salt (B) in an amount by weight at least three times as large as the amount of the organic pigment (A) and a water-soluble solvent (C) to finely mill the organic pigment (A), and then removing the water-soluble inorganic salt (B) and the water-soluble solvent (C) by washing the kneaded mixture with water, and a process for the production thereof.

12 Claims, No Drawings

INKJET RECORDING LIQUID AND PROCESS FOR THE PRODUCTION THEREOF

This application is a continuation-in-part of the application, Ser. No. 08/714,129 filed Jan. 26, 1996 now U.S. Pat. No. 5,716,435 and which is a 371 of PCT/JP96/00147, filed Jan. 26, 1997.

TECHNICAL FIELD

The present invention relates to an inkjet recording liquid excellent in water resistance, transparency and ejection stability from a nozzle, and a process for the production thereof.

TECHNICAL BACKGROUND

As an inkjet recording liquid, a solution of a water-soluble dye such as an acid, a direct dyeor a basic dye in a glycol-containing solvent and water has been and is used in most cases (JP-A-53-61412, JP-A-54-89811 and JP-A-55-65269). As a water-soluble dye, generally, a dye having a high solubility in water is used for achieving the stability of a recording liquid. As a result, an inkjet print is generally poor in water resistance, and has a problem that a printed portion easily blots when water is spilled thereon.

For overcoming the above poor water resistance, attempts have been made to modify the structure of a dye or to prepare a highly basic recording liquid (JP-A-56-57862). Further, attempts have been also made to utilize a reaction between a recording sheet and a recording liquid for improving the water resistance (JP-A-50-49004, JP-A-57-36692, JP-A-59-20696 and JP-A-59-146889). These methods produce remarkable effects as far as specific recording sheets are concerned. However,these methods are not generally used since a limitation is imposed on the recording sheet. Further, when a recording sheet other than the specific ones is used, a recording liquid containing a water-soluble dye mostly often gives prints having no sufficient water resistance.

Further, as a recording liquid having good water resistance, recording liquids obtained by dispersing or dissolving oil-soluble dyes in solvents having high boiling points are available. However, these recording liquids have problems in the odors of solvents and the discharge of solvents and they are therefore environmentally undesirable. Further, another problem is that it is required to recover the solvents when recording is conducted in a large volume or in some place where a recording apparatus is located.

It is therefore being attempted to develop recording liquids which are dispersions of pigments in water-based solvent, for improving a printed product in water resistance.

However, as a printer using an inkjet recording liquid is desired to achieve a high resolution, the diameter of a nozzle decreases, and it is accordingly required to finely mill a colorant to decrease the particle diameter of the colorant.

Further, in forming an image on a transparent substrate for an overhead projector, it is demanded to achieve transparency equivalent to that of a dye, and finely milling is also required in view of the color development of a pigment.

Generally, as the dispersibility of a coating composition, an ink or the like is increased by decreasing the diameter of a pigment, the transparency improves. However, when a general dispersing machine such as a sand mill, a three-roll mill or a ball mill is used to carry out dispersing up to primary particles, the transparency no longer improves.

That is mainly because secondary particles are simply broken into primary particles in the dispersion step using the general. dispersing machine, and it is required to further finely mill the primary particles for further improving the transparency. A high-speed sand mill may sometimes further finely mill the primary particles of some pigments. However, it is practically very difficult to further finely mill the primary particles even if very large energy is applied.

As means of milling primary particles, there is known a method in which a solution of a pigment in a strong acid such as concentrated sulfuric acid or polyphosphoric acid is added to cold water to precipitate the pigment in the form of fine particles. In this method, however, the pigments that can be used are notably limited due to the solubility and stability of them in/to the strong acid. Further, since a pigment finely milled by the above method undergoes strong secondary aggregation when dried, it is very difficult to re-disperse the dried pigment up to the level of primary particles.

There is known another method in which a pigment and a solid resin are vigorously kneaded under heat with a two-roll mill or a Banbury mixer. Since, however, a pigment generally undergoes a crystal growth at a high temperature, the milling comes to an end when the milling force and the crystal growth are brought into an equilibrium state, and the milling by the above method has a limitation.

Further, an attempt has been also made to mechanically knead and mill a mixture of an organic pigment such as quinacridone or fused azo, a water-soluble inorganic salt and a water-soluble solvent at a high temperature of at least 80° C. (JP-A-8-231780). In this method, particles having uniform forms can be obtained, while no intended finely milled pigment particles can be obtained due to similar crystal growth.

It is an object of the present invention to overcome the above problems of the conventional methods and to provide a water-dispersed inkjet recording liquid which is excellent in water resistance and transparency and has excellent stability in ejection from a nozzle, and a process for the production thereof.

DISCLOSURE OF THE INVENTION

Concerning an inkjet recording liquid obtained by dispersing a colorant in a water-based liquid, the present invention provides a water-dispersed inkjet recording liquid containing, as said colorant, a water-based dispersion of an organic pigment (A) which is at least one member selected from the group consisting of a quinacridone pigment, a benzimidazolone pigment, an insoluble azo pigment, a fuzed azo pigment, a quinophthalone pigment, a naphthol pigment, a perylene pigment and an isoindolinone pigment and has an average particle diameter of 10 to 150 nm (measured by laser scattering), the water-based dispersion of the organic pigment (A) being obtained by mechanically kneading a mixture containing at least three components of the organic pigment (A), a water-soluble inorganic salt (B) in an amount by weight at least three times as large as the amount of the organic pigment (A) and a water-soluble solvent (C) at 30 to 65° C. to finely mill the organic pigment (A), and then removing (B) and (C) by washing the kneaded mixture with water.

Further, the present invention provides a process for the production of an inkjet recording liquid, which comprises the following steps a)–d), a) mechanically kneading a mixture containing at least three components of an organic pigment (A), a water-soluble inorganic salt (B) in an amount by weight at least three times as large as the amount of the organic pigment (A) and a water-soluble solvent (C) at 30 to 65° C., to finely mill the organic pigment (A), b) removing the water-soluble inorganic salt (B) and the water-soluble solvent (C) from the mixture of the finely milled organic pigment (A) by washing the mixture with water, to obtain a water-based dispersion of the organic pigment (A) having an average particle diameter of 10 to 150 nm (measured by laser scattering), c) adding and dispersing a water-based resin to/in the water-based dispersion, and d) adding water and an additive to the dispersion to dilute the dispersion and filtering the diluted dispersion through a filter having an opening diameter of 3 μm or less, preferably, 1 μm or less.

PREFERRED EMBODIMENTS OF THE INVENTION

For obtaining a water-dispersed inkjet recording liquid and transparency of a printed product thereof, the present invention uses, as a colorant, an organic pigment of which the primary particles are finely milled in the presence of an inorganic salt as a milling aid (this step will be referred to as "salt-milling" hereinafter). In the present invention, further, the salt-milling is carried out at 30 to 65° C. by preventing an increase in the treatment temperature by cooling a milling machine with cold water, whereby the crystal growth of a pigment is inhibited, and the pigment particles are finely milled to 0.01 to 0.1 μm and have a uniform particle diameter. Further, in this case, a pigment derivative (D) or a resin (E) which is a solid and water-insoluble at room temperature is used in combination, whereby the present invention provides an inkjet recording liquid which gives a printed product which is transparent and excellent in water resistance.

The above salt-milling method will be more specifically discussed. A mixture containing at least 3 components of an organic pigment (A) which is at least one member selected from the group consisting of a quinacridone pigment, a benzimidazolone pigment, an insoluble azo pigment, a fuzed azo pigment, a quinophthalone pigment, a naphthol pigment, a perylene pigment and an isoindolinone pigment, a water-soluble inorganic salt (B) in an amount by weight at least 3 times as large as the amount of the organic pigment (A) and a water-soluble solvent (C) and optionally containing a pigment derivative (D) of the formula (1) to be described later or a resin (E) which is a solid and water-insoluble at room temperature is formed into a clayey mixture, vigorously kneaded with a kneader at 30 to 65° C., etc., then poured into water, and stirred with a high-speed mixer to bring it into a slurry state. Then, the slurry is repeatedly filtered and washed with water to remove the water-soluble inorganic salt (B) and the water-soluble solvent (C).

In the above method, the organic pigment (A) can be finely milled, and there can be obtained a water-based dispersion of the organic pigment (A) having an average particle diameter of 10 to 150 nm (measured by laser scattering).

Further, when the pigment derivative (D) is used together with an organic pigment (A), there is obtained a pigment treated with the pigment derivative (D)(to be also referred to as "untreated pigment" hereinafter).

Further, when the resin (E) which is a solid and water-insoluble in room temperature is used together with an. organic pigment (A), there is obtained a pigment treated with the water-insoluble resin (E) (to be also referred to as "treated pigment" hereinafter)

A water-based dispersion of an organic pigment (A) which is finely milled to have an average particle diameter of 10 to 150 nm (measured by laser scattering) or a water-based dispersion of the treated pigment is used as a colorant in the inkjet recording liquid.

The above water-based dispersion is a dispersion of fine particles. When it is formed into an inkjet recording liquid, it is well dispersed together with a water-based resin or a dispersing agent which is further added, to form a stable dispersion.

The above dispersing procedure is carried out by means of a general dispersing machine such as a sand mill, or the like, whereby there is obtained an inkjet recording liquid which contains fine pigment particles and is in a stably dispersed state as compared with a case using an untreated pigment (pigment not treated by salt-milling) for a short period of time without taking much dispersing time.

The organic pigment (A) used in the present invention is at least one member selected from the group consisting of a quinacridone pigment, a benzimidazolone pigment, an insoluble azo pigment, a fuzed azo pigment, a quinophthalone pigment, a naphthol pigment, a perylene pigment and an isoindolinone pigment.

The organic pigment (A) specifically includes the following pigments (shown using color index (C.I.) numbers). Examples of the quinacridone pigment include C.I. Pigment Red 122, 192, 202, 206, 207 and 209 and Pigment Violet 19 and 42. Examples of the benzoimidazolone pigment include C.I. Pigment Yellow 120, 151, 154, 175, 180, 181 and 194. Examples of the insoluble azo pigment include C.I. Pigment Yellow 12, 13, 14, 16, 17, 55, 63, 81, 83, 87, 106, 113, 121, 124, 126, 127, 130, 152, 169, 170, 171, 172, 174, 176 and 188. Examples of the quinophthalone pigment include C.I. Pigment yellow 138. Examples of the naphthol pigment include C.I. Pigment Red 1, 2, 3, 4, 5, 6, 7, 8, 9, 10, 11, 12, 13, 14, 15, 16, 17, 18, 21, 22, 23, 31, 32, 95, 112, 114, 119, 136, 146, 147, 148, 150, 151, 164, 170, 184, 187, 188, 210, 212, 213, 222, 223, 237, 245, 253, 256, 258 and 261. Examples of the perylene pigment include C.I. Pigment Red 123, 149, 178, 179, 190 and 224. Examples of the isoindolinone pigment include C.I. Pigment Yellow 109, 110 and 173.

The water-soluble inorganic salt (B) used in the present invention includes sodium chloride and potassium chloride.

The inorganic salt (B) is used for finely milling the organic pigment (A). Commercially available salt may be used as an inorganic salt (B) after it is pulverized with a pulverizer. For finely milling the organic pigment (A), the amount of the inorganic salt (B) by weight is required to be at least 3 times as large as weight of the organic pigment (A). When the amount of the inorganic salt (B) is smaller than three times by weight, no desired fine particles are obtained. Although not specially limited, the upper limit of the above amount of the inorganic salt (B) is up to 20 times, preferably up to 10 times. When the amount of the inorganic salt (B) is greater than the above upper limit, the washing treatment at the subsequent step is hard to carry out, and there is another problem that the substantial amount of the organic pigment (A) that can be treated decreases.

In the present invention, the water-soluble solvent (C) is used as a wetting agent for salt-milling, and the water-soluble solvent is not specially limited so long as it is soluble in water. The amount of the water-soluble solvent (C) by weight is generally 0.5 to 10 times as large as the weight of the organic pigment (A). When the amount of the water-soluble solvent (C) is smaller than the lower limit of the above range, excessive shear is exerted on the kneading of the mixture containing the organic pigment and the water-soluble inorganic salt, and the kneading is substantially difficult. When the above amount exceeds the upper limit, undesirably, the mixture is almost in a liquid state, no shear is exerted at a kneading step, and the organic pigment cannot be finely milled.

For example, the solvent is selected from 2-(methoxymethoxy)ethanol, 2-butoxyethanol, 2-isopentyloxy)ethanol, 2-(hexyloxy)ethanol, diethylene glycol, diethylene glycol monomethyl ether, diethylene glycol monoethyl ether, diethylene glycol monobutyl ether, triethylene glycol, triethylene glycol monomethyl ether, liquid polyethylene glycol, 1-methoxy-2-propanol, 1-ethoxy-2-propanol, 1-ethoxy-2-propanol, dipropylene glycol, dipropylene glycol monomethyl ether, dipropylene glycol monoethyl ether and polypropylene glycol having a low molecular weight.

The pigment derivative (D) used in the present invention is a derivative of an organic pigment, which is a derivative made effective for dispersing the organic pigment (A) by adding a substituent to P of the following formula (1), i.e., an organic pigment residue or a heterocyclic ring residue.

$$P-[X-Y-Z-N(R^1)R^2]_n \qquad (1)$$

wherein P is an organic pigment residue, a heterocyclic ring residue or an aromatic polycyclic compound residue, X is a divalent binding group formed of a chemically rational combination of 2 to 15 atoms selected from S, C, N, O and H, Y is a divalent binding group selected from a direct bond, —NR— (in which R is H or an alkyl group having 1 to 18 carbon atoms) or —O—, Z is an alkylene group having 1 to 6 carbon atoms, either each of $R^1$ and $R^2$ is independently an optionally substituted alkyl group having 1 to 18 carbon atoms or $R^1$ and $R^2$ form a heterocyclic ring which may have a substituent, and n is an integer of 1 to 3.

P in the formula (1), i.e., the organic pigment residue or the heterocyclic ring residue includes azo, phthalocyanine, quinacridone, benzimidazole, anthraquinone, perylene, perinone, thioindigo, dioxazine, isoindolinone, quinophthalone, triphenylmethane and metal complex residues.

Generally, the organic pigment (A) and P of the pigment derivative (D), i.e., the organic pigment residue or the heterocyclic ring residue are preferably used as a combination of those of the same types. For example, a red pigment is combined with a quinacridone residue, and a yellow pigment is combined with a benzimidazole residue, although it is not always necessary to combine those of the same types.

The substituent(s) to be added to the above organic pigment residue or heterocyclic ring residue P has the formula of —[X—Y—Z—N(R$^1$)R$^2$]$_n$, X is a divalent binding group formed of a chemically rational combination of 2 to 15 atoms selected from S, C, N, O and H. For example, X is —SO$_2$—, —CO—, —CH$_2$—, —CH$_2$S—, —CH$_2$O—, —COO—, —NH—, —CH$_2$NHCOCH— or a combination of these. X is preferably —SO$_2$—, —CO—, —CH$_2$— or the like. Y is a direct bond, —N(R)— (in which R is H or an alkyl group having 1 to 18 carbon atoms) or —O—. Z is an alkylene group having 1 to 6 carbon atoms, or $R^1$ and $R^2$ may form a heterocyclic ring. An element constituting the heterocyclic ring, other than carbon, includes N, O and S. The heterocyclic ring may have a substituent. n is an integer of 1 to 3.

The number (n) of the above substituent(s) to be added to the organic pigment or heterocyclic ring residue P is 1 to 3, and specific examples of the substituents are as follows.

1 —CH$_2$NH(CH$_2$)$_4$N(CH$_3$)$_2$
2 —CH$_2$NHCOCH(CH$_2$)N(C$_2$H$_5$)$_2$
3 —CH$_2$NHCOCH(CH$_2$)$_2$N(CH$_3$)$_2$
4 —SO$_2$NH(CH$_2$)$_2$N(C$_2$H$_5$)$_2$
5 —CH$_2$S—CH$_2$—N(C$_3$H$_7$)$_2$
6 —CH$_2$O—CH$_2$—N(CH$_3$)$_2$

7

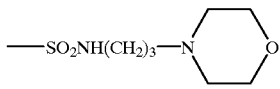

8 —SO$_2$NH (CH$_2$)$_2$—N(CH$_3$)$_2$
9 —SO$_2$NHCH$_2$—N( C$_2$H$_5$)$_2$
10 —CH$_2$S—CH$_2$—N(C$_4$H.)$_2$
11 —CH$_2$O—CH$_2$—N(C$_3$H3)$_2$
12 —CONH(CH1$_2$)$_3$—N(C$_4$H$_9$)$_2$

13

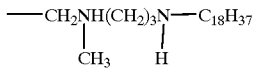

Preferably, the pigment derivative (D) is partially soluble in the water-soluble solvent used as a wetting agent at a salt-milling step. When the pigment derivative (D) is not soluble, it may be partially solubilized by neutralizing it with a diluted acid.

The above acid can be selected from acetic acid, hydrochloric acid or sulfuric acid.

The salt-milling may be also carried out in the presence of a pigment derivative which is in a liquid state at room temperature. Further, the salt-milling may becarried out in the presence of at least 2 kinds of derivatives, and in this case, one of the derivatives may be a derivative which is in a liquid state.

In the present invention, the amount of the pigment derivative (D) per 100 parts by weight of the organic pigment (A) is preferably 1 to 50 parts by weight. When the above amount is less than 1 part by weight, the coating effect is low, and the recording liquid shows poor dispersion stability with the passage of time. When the above amount is greater than 50 parts by weight, undesirably, the dispersion stability of the organic pigment (A) is contrariwise decreased to decrease the durability of a printed product.

The resin (E) which is a solid and water-insoluble at room temperature includes semi-synthetic polymers such as cellulose derivatives, rubber derivatives and protein derivatives, natural polymers such as rosin and oligomers of these in addition to pure synthetic polymers. However, these resins are required to be a solid and water-insoluble at room temperature and soluble in the water-soluble solvent used as a wetting agent in the salt-milling step.

The salt-milling may be carried out in the presence of at least two polymers, and one of the polymers may be a liquid polymer.

Of the above resins, a rosin epoxy resin and a (meth)acrylic resin in particular are widely usable in various cases, and as other resin, a rosin-modified maleic acid resin and a rosin-modified phenolic resin are used. Further, these resins have a high salt-milling effect.

The epoxy resin used for the salt-milling in the present invention refers to an epoxide whose molecule has at least one epoxy group. An epoxy resin crosslinked with a crosslinking agent is not used in the present invention, since it generally has almost no solubility, and is dissolved in the above water-soluble solvent (C) in almost no case. The epoxide includes a bisphenol type epoxide, a novolak type epoxide, an alkylphenol type epoxide, a resorcin type epoxide, a polyglycol type epoxide, an ester type epoxide, a glycidyl type epoxide of N-glycidylamine and an alicyclic epoxide.

The (meth)acrylic resin used for the salt-milling in the present invention refers to a copolymer from an acrylic acid and/or a methacrylic acid and at least one of an acrylic acid ester monomer and/or a methacrylic acid ester monomer. The (meth)acrylic resin also refers to the above copolymer having units from 60 mol % or less of a radical-polymerizable monomer such as styrene, vinyl acetate or maleic anhydride. A three-dimensionally crosslinked polymer such as a copolyme:r having a unit from a polyfunctional monomer is not suitable for the present invention since it is poor in solubility and is dissolved in the above water-soluble solvent (C) in almost no case.

The amount of the resin (E) which is a solid and water-insoluble at room temperature per 100 parts by weight of the organic pigment (A) is preferably 10 to 50 parts by weight. When the above amount is less than 10 parts by weight, the coating effect is low, and the recording liquid shows poor dispersion stability with the passage of time. When the above amount is greater than 50 parts by weight, undesirably, the recording liquid decreases in concentration, or the colorant increases in an amount. As a result, the recording liquid has an increased viscosity and shows decreased ejection stability.

In the step of the salt-milling, additives such as a dispersing agent and a plasticizer may be used in combination with the above pigment derivative and the above resin which is a solid and water-insoluble at room temperature. Further, a mixture of at least two pigments may be treated.

The present invention has a characteristic feature in that an inkjet recording liquid is produced by using, as a colorant, a water-based dispersion of the organic pigment treated by the above salt-milling without carrying out any drying step.

The production of the inkjet recording liquid containing the water-based dispersion of the organic pigment (A) will be explained below.

The above production may be carried out by a method in which the organic pigment obtained by the salt-milling is prepared as a dispersion containing approximately 80 to 50% by weight of the organic pigment, the dispersion is mixed with a water-based resin used as a dispersing agent or fixing and dispersed and then components such as water, a wetting agent and additive(s) are added, or by a method in which the dispersion of the organic pigment and a water-based resin to be used for fixing are kneaded with a dispersing machine such as a two-roll mill and the resultant kneaded mixture is further dispersed together with water and optionally other additive(s).

In the present invention, it is preferred to employ a method in which the organic pigment is dispersed together with other components for an inkjet recording liquid for a short period of time according to a general dispersion method in a state where the amount of the organic pigment is approximately 10 to 40% by weight and then the resultant dispersion is diluted to a concentration suitable for printing, or a method in which additive(s) is added further and the mixture is filtered.

The inkjet recording liquid of the present invention contains 0.1 to 10 parts by weight, as a solid, of the organic pigment obtained by the above salt-milling treatment per 100 parts by weight of the water-dispersed inkjet recording liquid. In addition, the inkjet recording liquid of the present invention optionally contains additives such as a water-based resin which works for fixing properties and dispersibility, a neutralizing agent for the water-based resin, a dispersing agent for maintaining the stable dispersing of the organic pigment, a water-based solvent for maintaining the proper wettability of the recording liquid, an antifungal agent for preventing the occurrence of mold and bacteria, an agent for adjusting surface tension and penetration, a chelating agent and an antifoaming agent. Further, the inkjet recording liquid of the present invention contains 50 to 98% by weight of water.

The dispersing machine used for the production of the recording liquid containing the organic pigment treated by the salt-milling is selected from a sand mill, a homogenizer, a ball mill, a paint shaker, an ultrasonic dispersing machine or a dispersing machine for carrying out the dispersing in a high-pressure chamber by a cavitation effect.

The mixing and stirring can be carried out not only with a general stirrer having blade(s) but also with a high-speed dispersing machine or emulsifier.

Preferably, the recording liquid mixture is fully filtered through a filter having an opening diameter of 3 $\mu$m or less before or after the mixture is diluted. Preferably, the recording liquid mixture is filtered through a filter having an opening diameter of 1.0 $\mu$m or less, more preferably 0.45 $\mu$m or less.

Prior to the filtering, solids having large diameters may be removed by centrifugal separation, which can decrease the clogging of the filter and increase the use period of the filter.

In the recording liquid of the present invention, the organic pigment (A) is finely milled, the pigment in the recording liquid therefore has an average particle diameter, measured by a laser scattering method, of 10 to 150 nm, preferably 10 to 100 nm, which is further preferred for a recording liquid. Since the pigment has such a particle diamter, the filtering procedure in the production of the recording liquid is easy, and the precipitation with the passage of time is small.

As the water-based resin which works for fixing properties and dispersibility, a water-soluble resin which is dissolved in water and a water-dispersible emulsion or colloidal dispersion resin which is dispersed in water are used alone or as a mixture. The above resin includes acrylic, styrene-acrylic, polyester-based, polyamide-based, polyurethane-based or fluorine-based water-soluble resins and water-dispersible emulsion or colloidal dispersion resins.

The amount of the water-based resin in the recording liquid is 0.5 to 10% by weight, preferably 1 to 5% by weight. When the amount of the water-based resin is less than the lower limit of the above range, the colorant cannot be sufficiently fixed. When it is greater than the upper limit, undesirably, the viscosity of the recording liquid increases or the ejection stability decreases.

When a water-soluble resin is used as a water-based resin, the water-soluble resin tends to increase the viscosity of the recording liquid. On the other hand, a water-dispersible resin can maintain the viscosity at a low level and can improve the water resistance of a recorded product.

The dissolving or dispersing stability of the above resins can be adjusted by properly adding ammonia, an amine or an inorganic alkali as required.

In the present invention, a water-based solvent is added as required, in addition to water, for preventing the solidification of the recording liquid in a nozzle portion, achieving the stable ejection of the recording liquid and preventing the drying of the recording liquid in a nozzle portion with the passage of time.

The above water-based solvent includes ethylene glycol, diethylene glycol, propylene glycol, triethylene glycol, polyethylene glycol, glycerin, tetraethylene glycol, dipropylene glycol, ketone alcohol, diethylene glycol monobutyl ether, ethylene glycol monobutyl ether, ethylene glycol monoethyl ether, 1,2-hexanediol, N-methyl-2-pyrrolidone, substituted pyrrolidone, 2,4,6-hexanetriol, tetrafurfuryl alcohol and 4-methoxy-4-methylpentanone.

Further, for the purpose of promoting the drying of the recording liquid on paper, an alcohol such as methanol, ethanol or isopropyl alcohol may be used.

The above water-based solvents are used alone or as a mixture in an amount of 0 to 50% by weight based on the recording liquid. Water as a medium for the recording liquid is selected from deionized water from which metal ion, etc., are removed or distilled water.

When a sheet used for printing in the recording liquid is paper, a penetrant may be used for promoting the penetration of the recording liquid into the paper and promoting the apparent drying properties. The penetrant includes glycol ethers such as diethylene glycol monobutyl ether, etc., described as a water-based solvent, alkylene glycol, alkylenediol, polyethylene glycol monolauryl ether, sodium laurylsulfate, sodium dodecylbenzenesulfonate, sodium oleate and sodium dioctylsulfosuccinate. These penetrants have a sufficient effect when used in an amount of not exceeding 5% by weight based on the recording liquid. When the amount of the penetrant is greater than the above, undesirably, the penetrant causes a feathering of prints and print-through.

The recording liquid of the present invention may contain an antifungal agent for preventing the occurrence of mold. The antifungal agent includes sodium dehydroacetate, sodium benzoate, sodium pyridinethione-1-oxide, zinc pyridinethione-1-oxide, 1,2-bnezisothiazolin-3-one and an amine salt of 1-benzisothiazolin-3-one. The antifungal agent is used in an amount of approximately 0.05 to 1.0% of the recording liquid.

Further, for preventing the deposition of a metal on a nozzle portion and the precipitation of insolubles in the recording liquid, a chelating agent may be added. The chelating agent works for blocking metal ion in the recording liquid. Specific examples of the chelating agent are as follows. Ethylenediaminetetracetic acid, sodium salt of ethylenediaminetetraacetic acid, diammonium salt of ethylenediaminetetraacetic acid, and tetrammonium salt of ethylenediaminetetraacetic acid. The amount of the chelating agent based on the recording liquid is approximately 0.005 to 0.5% by weight.

Further, for adjusting the pH of the recording liquid to a desired pH to secure the stability of the recording liquid or the stability of prevention of corrosion of recording liquid tubings of a recording apparatus, the recording liquid may contain an adjusting agent such as an amine, an inorganic salt or ammonia and a buffer solution such as phosphoric acid.

Further, for preventing the occurrence of foams at the time of ejection of the recording liquid, circulation or movement inside tubings and production of the recording liquid, an antifoaming agent may be added to the recording liquid.

For maintaining the stable dispersion of the pigment, when the water-based resin cannot be used as a dispersing agent, or for achieving further stable dispersion, a surfactant may be used. As a surfactant, an anionic, nonionic, cationic or amphoteric surfactant may be used.

The anionic surfactant includes fatty acid salt, alkyl sulfate, alkylarylsulfonate, alkylnaphthalenesulfonate, dialkylsulfonate, dialylsulfosuccinate, alkyldiarylether disulfonate, alkylphosphate, polyoxyethylene alkyl ehter sulfate, polyoxyethylene alkylaryl ether sulfate, a naphthalenesulfonic acid formalin condensate, polyoxyethylene alkylphosphate, glycerol borate fatty acid ester, and polyoxyethylene glycerol fatty acid ester.

The nonionic surfactant includes polyoxyethylene alkyl ether, polyoxyethylene alkylaryl ether, a polyoxyethylene oxypropylene block copolymer, sorbitan fatty acid ester, polyoxyethylenesorbitan fatty acid ester, polyoxyethylenesolbitol fatty acid ester, glycerin fatty acid ester, polyoxyethylene fatty acid ester, polyoxyethylenealkylamine, and fluorine-containing and silicon-containing nonionic surfactants.

The cationic surfactant includes alkylamine salt, quaternary ammonium salt, alkylpyridinium salt and alkylimidazolium salt.

The amphoteric surfactant includes alkylbetaine, alkylamine oxide and phosphadyl choline.

For adjusting the hue of the pigment and imparting a concentration, a dye may be used in such a manner that there is caused no problem on water resistance and light resistance.

Some dyes destabilize the dispersion of the pigment, and the amount of the dye based on the pigment is therefore required to be not more than 40% by weight, preferably not more than 25% by weight.

The dye includes water-insoluble dyes such as a disperse dye and an oil-soluble dye, a direct dye, an acid dye, a basic dye, a reactive dye and a metal-containing dye. These dyes are preferably purified dyes, i.e., those from which an inorganic salt is removed.

Specific examples of the dye include C.I. Direct Black 17, 19, 32, 51, 71, 108, 146, 154, 166, C.I. Acid Black 2, 7, 24, 26, 31, 52, 63, 112, 118, C.I. Basic Black 2, C.I. Direct Blue 6, 22, 25, 71, 90, 106, C.I. Acid Blue 9, 22, 40, 59, 93, 102, 104, 113, 117, 120, 167, 229, 234, C.I. Basic Blue 1, 3, 5, 7, 9, 24, 25, 26, 28, 29, C.I. Direct Red 1, 4, 17, 28, 83, C.I. Acid Red 1, 6, 32, 37, 51, 52, 80, 85, 87, 92, 94, 115, 180, 256, 315, 317, C.I. Basic Red 1, 2, 9, 12, 13, 14, 37, C.I. Direct Yellow 12, 24, 26, 28, 98, C.I. Acid Yellow 11, 17, 23, 25, 29, 42, 61, 71, C.I. Basic Yellow 11, 28, C.I. Direct Orange 34, 39, 44, 46, 60, C.I. Direct Violet 47, 48, C.I. Direct Brown 109, C.I. Direct Green 59, C.I. Acid Oragne 7, 19, C.I. Acid Violet 49, and C.I. Basic Violet 7, 14, 27.

As other additive, urea and dimethylurea may be added.

Although differing depending upon the method of a recording apparatus, the recording liquid is preferably prepared as a liquid having a viscosity of 0.8 to 15 cps (25° C.).

The recording liquid preferably has a surface tension of 25 to 60 dyn/cm. Although the pH is not specially limited, the recording liquid has a pH in the range of from 4 to 12, and preferably it is alkaline, having a pH of 7 to 10.

The present invention will be explained with reference to Examples hereinafter, in which "part" and "%" stand for "part by weight" and "% by weight".

EXAMPLE 1-1

250 Parts of a quinophthalone pigment ("Pariotol Yellow K0961HD" supplied by BASF), 2,500 parts of sodium chloride and 160 parts of polyethylene glycol (supplied by Tokyo Chemical Industry Co., Ltd.) were charged into a 1-gallon kneader of stainless steel (supplied by Inouesha Seisakusho), and kneaded at 60° C. for 4 hours. Then, the mixture was poured into 2.5 liters of warm water, and stirred with a high-speed mixer under heat around 80° C. for about 1 hour to form a slurry. Then, the filtering of the slurry and the washing thereof with water were repeated five times to remove the sodium chloride and the solvent, whereby a water-based dispersion (treated pigment dispersion) having a solid content of 50% was obtained.

The following materials were placed in a sand mill and dispersed for 4 hours to prepare a concentrated inkjet recording liquid.

| | |
|---|---|
| Yellow pigment (treated pigment dispersion, product having a solid content ot 50%) | 30.0 parts |
| Acrylic resin aqueous solution ("Joncryl 62") supplied by Johnson Polymer Corp., solid content 34.6%) | 3.0 parts |
| Dispersing agent ("Emulgen 420" supplied by Kao Corp.) | 2.0 parts |
| Purified water | 50.0 parts |
| Glycerin | 6.0 parts |

After the above materials were dispersed, the following components were mixed. Then, the mixture was filtered through a 1-$\mu$m membrane filter and then filtered through a 0.45-$\mu$m membrane filter to give a recording liquid.

| | |
|---|---|
| The above dispersion | 13.5 parts |
| Dispersing agent ("Emulgen 420" supplied by Kao Corp.) | 0.2 part |
| Acrylic resin aqueous solution ("Emapoly TYN-40" supplied by Gifu Shellac, solid content 44.8%) | 3.0 parts |
| Ethylene glycol | 30.0 parts |
| Antifungal agent ("Sodium omadine", supplied by Olin Corp.) | 0.15 part |
| Ethylenediamine tetraacetic acid sodium salt | 0.02 part |
| Purified water | 63.53 part |

The recording liquid was evaluated for filterability at the time of obtaining the same. The obtained recording liquid was evaluated for a viscosity and an average particle diameter as follows. Further, the recording liquid was evaluated for ejection properties, a printed state, a transparency of a printed product, and a water resistance of the printed product. Table 1 shows the results.

[Filterability] Amounts of filtrates obtained through 1-$\mu$m and 0.45-$\mu$m membrane filters having a diameter of 90 mm for a predetermined period of time.

[Viscosity] Measured at 25° C. with a Brookfield viscometer.

[Average particle diameter] Measured with a particle distribution meter using a laser scattering method ("DLS-700" supplied by Otsuka Denshi Co.).

[Printed state] The recording liquid was placed in a cartridge of HG5130 supplied by Seiko Epson Corporation, and used for printing on a sheet of plain paper. A printed product was visually evaluated for a printed state.

[Ejection properties] The ejection state from a nozzle in continuous printing was evaluated on the basis of printed products.

A: Printing was accurately continuously carried out on given sites.

B: Although printing was carried out continuously, omissions occurred somewhere in printing and omissions occurred in given sites.

[Water resistance] When a recording was effected on a sheet of normal paper, water was dropped onthe surface having a record or a printed product was dried and then immersed in water for 1 minute to visually evaluate the feathering of an ink and the running of the ink.

[Transparency] An ink was spread over an inkjet OHP sheet with a 1.5-mil applicator and visually evaluated for transparency.

EXAMPLE 1-2

250 Parts of a quinophthalone pigment ("Pariotol Yellow K0961HD" supplied by BASF), 2,500 parts of sodium chloride, 25 parts of a yellow pigment dispersing agent (P-[CH$_2$NH(CH$_2$)$_4$N(CH$_3$)$_2$]$_3$, P=benzimidazole residue) and 160 parts of polyethylene glycol 300 (supplied by Tokyo Chemical Industry Co., Ltd.) were charged into a 1-gallon kneader of stainless steel (supplied by Inoue Seisakusho), and kneaded at 60° C. for 3 hours. Then, the resultant mixture was poured into 2.5 liters of warm water, and stirred with a high-speed mixer under heat around 80° C. for about 1 hour to form a slurry. Then, the filtering of the slurry and the washing thereof with water were repeated five times to remove the sodium chloride and the solvent, whereby a water-based dispersion (pigment derivative-treated pigment dispersion) having a solid content of 50% was obtained. The following materials were placed in a sand mill and dispersed for 4 hours to prepare a concentrated inkjet recording liquid.

| | |
|---|---|
| Yellow pigment (pigment derivative-treated pigment dispersion, product having a solid content of 50%) | 30.0 parts |
| Acrylic resin aqueous solution ("Joncryl 61J" supplied by Johnson Polymer Corp., solid content 31.0%) | 3.0 parts |
| Dispersing agent ("Emulgen 420" supplied by Kao Corp.) | 1.0 part |
| Purified water | 50.0 parts |
| Glycerin | 6.0 parts |

After the above materials were dispersed, the following components were mixed. Then, the mixture was filtered through a 1-$\mu$m membrane filter and then filtered through a 0.45-m membrane filter to give a recording liquid.

| | |
|---|---|
| The above dispersion | 13.5 parts |
| Dispersing agent ("Emulgen 420" supplied by Kao Corp.) | 0.2 part |
| Acrylic resin emulsion ("W-215" supplied by Nippon Polymer Industry Co., Ltd. solid content 30%) | 1.0 part |
| Ethylene glycol | 10.0 parts |
| Antifungal agent ("Sodium omadine", supplied by Olin Corp.) | 0.15 part |
| Ethylenediamine tetraacetic acid sodium salt | 0.02 part |
| Purified water | 63.53 part |

EXAMPLE 1-3

250 Parts of a quinophthalone pigment ("Pariotol Yellow K0961HD" supplied by BASF), 2,500 parts of sodium chloride, 90 parts of "Epikote 1004" (epoxy resin, supplied by Yuka-Shell Epoxy K.K.) and 160 parts of polyethylene glycol 300 (supplied by Tokyo Chemical Industry Co., Ltd.) were charged into a 1-gallon kneader of stainless steel (supplied by Inoue Seisakusho), and kneaded at 600° C. for 3 hours. Then, the resultant mixture was poured into 2.5 liters of warm water, and stirred with a high-speed mixer under heat around 80° C. for about 1 hour to forma slurry. Then, the filtering of the slurry and the washing thereof with water were repeated five times to remove the sodium chloride and the solvent, whereby a water-based dispersion (pigment dispersion treated with epoxy) having a solid content of 50% was obtained.

The following materials were placed in a sand mill and dispersed for 3 hours to prepare a concentrated inkjet recording liquid.

| | |
|---|---|
| Yellow pigment (pigment dispersion treated with epoxy, product having a solid content of 50%) | 30.0 parts |
| Acrylic resin aqueous solution ("Joncryl 61J" supplied by Johnson Polymer Corp., solid content 31.0%) | 3.0 parts |
| Dimethylaminoethanol | 0.1 part |
| Dispersing agent ("Emulgen 420" supplied by Kao Corp.) | 1.0 part |
| Purified water | 50.0 parts |
| Glycerin | 6.0 parts |

After the above materials were dispersed, the following components were mixed. Then, the mixture was filtered through a 1-$\mu$m membrane filter and then filtered through a 0.45-$\mu$m membrane filter to give a recording liquid.

| | |
|---|---|
| The above dispersion | 13.5 parts |
| Dispersing agent ("Emulgen 420" supplied by Kao Corp.), | 0.2 part |
| Acrylic resin emulsion ("W-215" supplied by Nippon Polymer Industry Co., Ltd., solid content 30%) | 1.0 part |
| Ethylene glycol | 10.0 parts |
| Antifungal agent ("Sodium omadine", supplied by Olin Corp.) | 0.15 part |
| Ethylenediamine tetraacetic acid sodium salt | 0.02 part |
| Purified water | 63.53 part |

EXAMPLE 2-1

A water-based pigment dispersion (treated pigment dispersion) was obtained in the same manner as in Example 1-1 except that the quinophthalone pigment in Example 1-1 was replaced with 260 parts of a benzimidazolone pigment ("Hostaperm Yellow H3G" supplied by Hoechst Industry Limited). Then, an inkjet recording liquid excellent in transparency and water resistance was obtained in the same manner as in Examples 1 except that the above dispersion was dispersed with a sand mill for 5 hours to obtain a concentrated inkjet recording liquid. Table 1 shows the evaluation results.

EXAMPLE 2-2

An inkjet recording liquid excellent in transparency and durability was obtained in the same manner as in Example 1-2 except that the quinophthalone pigment in Example 1-2 was replaced with 260 parts of a benzimidazolone pigment ("Hostaperm Yellow H3G" supplied by Hoechst Industry Limited) and that the amount of the the yellow pigment dispersing agent was changed from 25 parts to 15 parts. Table 1 shows the results.

EXAMPLE 2-3

A water-based pigment dispersion (treated pigment dispersion) was obtained in the same manner as in Example 1-3 except that the quinophthalone pigment in Example 1-3 was replaced with 260 parts of a benzimidazolone pigment ("Hostaperm Yellow H3G" supplied by Hoechst Industry Limited). Then, an inkjet recording liquid excellent in transparency and water resistance was obtained in the same manner as in Example 1-3. Table 1 shows the evaluation results.

EXAMPLE 3-1

250 Parts of a naphthol pigment ("Permanent Red F4R" supplied by Hoechst Industry Limited), 900 parts of sodium chloride and 160 parts of diethylene glycol (supplied by Tokyo Chemical Industry Co., Ltd.) were charged into the same kneader as that described in Examples 1, and kneaded at 40° C. for 5 hours. Then, the kneaded mixture was treated in the same manner as in Example 1-1 to give a treated pigment water-based dispersion having a solid content of 50%.

The following materials were placed in a sand mill and dispersed for 4 hours to prepare a concentrated inkjet recording liquid.

| | |
|---|---|
| Red pigment (treated pigment dispersion, product having a soiid content of 50%) | 30.0 parts |
| Acrylic resin aqueous emulsion ("F-157" supplied by Nippon Polymer Industry Co., Ltd., solid content 30%) | 1.3 parts |
| Dispersing agent ("Solsperse 27000" supplied by Zeneca K.K.) | 0.5 part |
| Purified water | 74.0 parts |
| Glycerin | 5.8 parts |
| Dimethylethanolamine | 0.1 part |

After the above materials were dispersed, the following components were mixed. Then, the mixture was filtered through a 1-$\mu$m membrane filter and then filtered through a 0.45-$\mu$m membrane filter to give a recording liquid. The recording liquid was evaluated for various properties in the same manner as in Examples 1. Table 1 shows the results.

| | |
|---|---|
| The above dispersion | 25.0 parts |
| Glycerin | 20.0 parts |
| Antifungal agent ("Sodium omadine", supplied by Olin Corp.) | 0.15 part |
| Ethylenediamine tetraacetic acid sodium salt | 0.02 part |
| Diethylene glycol monobutyl ether | 0.5 part |
| Silicon emulsion type aqueous antifoamer ("Antifoam E-20", supplied by kao Corp.) | 0.8 part |

EXAMPLE 3-2

250 Parts of a naphthol pigment ("Permanent Red F4R" supplied by Hoechst Industry Limited), 900 parts of sodium chloride, 25 parts of a red pigment dispersing agent (P—[$CH_2NH(CH_2)_4N(CH_3)_2$]$_3$, P=quinacridone), 100 parts of Joncryl 682 (acrylic oligomer supplied by Johnson Wax) and 160 parts of diethylene glycol (supplied by Tokyo Chemical Industry Co., Ltd.) were charged into the same kneader as that described in Examples 1, and kneaded at 40° C. for 5 hours. Then, the kneaded mixture was treated in the same manner as in Example 1-2 to give a pigment derivative-treated water-based pigment dispersion having a solid content of 50%.

The following materials were placed in a sand mill and dispersed for 4 hours to prepare a concentrated inkjet recording liquid.

| | |
|---|---|
| Red pigment (pigment derivative-treated water-based pigment dispersion, product having a solid content of 50%) | 30.0 parts |
| Acrylic resin emulsion ("F-157" supplied by Nippon | 1.3 parts |

-continued

| | |
|---|---|
| Polymer Industry Co., Ltd., solid content 30%) | |
| Dispersing aqent ("Solsperse 27000" supplied by Zeneca K.K.) | 0.5 part |
| Purified water | 74.0 parts |
| Glycerin | 5.8 parts |
| Dimethylethanolamine | 0.1 part |

After the above materials were dispersed, the following components were mixed. Then, the mixture was filtered through a 1-μm membrane filter and then filtered through a 0.45-μm membrane filter to give a recording liquid.

The recording liquid was evaluated for various. properties in the same manner as in Examples 1. Table 1 shows the results.

| | |
|---|---|
| The above dispersion | 25.0 parts |
| Glycerin | 20.0 parts |
| Antifungal agent ("Sodium omadine", supplied by Olin Corp.) | 0.15 part |
| Ethylenediamine tetraacetic acid sodium salt | 0.02 part |
| Diethylene glycol monobutyl ether | 0.5 part |
| Silicon emulsion type aqueous antifoamer ("Antifoam E20", supplied by kao Corp.) | 0.8 part |

EXAMPLE 3-3

250 Parts of a naphthol pigment ("Permanent Red F4R" supplied by Hoechst Industry Limited), 900 parts of sodium chloride, 100 parts of Joncryl 682 (acrylic oligomer supplied by Johnson Wax) and 160 parts of diethylene glycol (supplied by Tokyo Chemical Industry Co., Ltd.) were charged into the same kneader as that described in Examples 1, and kneaded at 50° C. for 5 hours. Then, the kneaded mixture was treated in the same manner as in Example 1-3 to give an acryl-treated water-based pigment dispersion having a solid content of 50%.

The following materials were placed in a sand mill and dispersed for 4 hours to prepare a concentrated inkjet recording liquid.

| | |
|---|---|
| Blue pigment (acryl-treated water-based pigment dispersion, product having a solid content of 50%) | 30.0 parts |
| Acrylic resin emulsion ("F-157" supplied by Nippon Polymer Industry Co., Ltd., solid content 30%) | 1.3 parts |
| Aqueous ammonia 10% | 0.3 part |
| Dispersing agent ("Solsperse 27000" supplied by Zeneca K.K.) | 0.5 part |
| Purified water | 74.0 parts |
| Glycerin | 5.8 parts |
| Dimethylethanolamine | 0.1 part |

After the above materials were dispersed, the following components were mixed. Then, the mixture was filtered through a 1-μm membrane filter and then filtered through a 0.45-μm membrane filter to give a recording liquid.

| | |
|---|---|
| The above dispersion | 25.0 parts |
| Glycerin | 10.0 parts |
| Antifungal agent ("Sodium omadine", supplied by Olin Corp.) | 0.15 part |
| Ethylenediamine tetraacetic acid sodium salt | 0.02 part |
| Diethylene glycol monobutyl ether | 0.5 part |
| Silicon emulsion type aqueous antifoamer ("Antifoam E20", suppiied by kao Corp.) | 0.8 part |

EXAMPLE 4-1

250 Parts of a quinacridone pigment ("Hostaperm Pink E", supplied by Hoechst Industry Limited), 2,500 parts of sodium chloride and 160 parts of polyethylene glycol 300 (supplied by Tokyo Chemical Industry Co., Ltd.) were charged into a 1-gallon kneader of stainless steel (supplied by Inoue Seisakusho), and kneaded at 60° C. for 3 hours. Then, the resultant mixture was poured into 2.5 liters of warm water, and stirred with a high-speed mixer under heat around 80° C. for about 1 hour to form a slurry. Then, the filtering of the slurry and the washing thereof with water were repeated five times to remove the sodium chloride and the solvent, whereby a water-based pigment dispersion (treated pigment dispersion) having a solid content of 50% was obtained.

The following materials were placed in a paint shaker and dispersed for 4 hours to prepare a concentrated inkjet recording liquid.

| | |
|---|---|
| Red pigment (treated pigment dispersion, product having a solid content of 50%) | 30.0 parts |
| Acrylic resin aqueous solution ("Joncryl 62" supplied by Johnson Polymer Corp., solid content 34.6%) | 3.0 parts |
| Dispersing agent ("Emulgen A-90" supplied by Kao Corp.) | 1.0 part |
| Purified water | 50.0 parts |
| Glycerin | 6.0 parts |

After the above materials were dispersed, the following components were mixed. Then, the mixture was filtered through a 1-μm membrane filter and then filtered through a 0.45-μm membrane filter to give a recording liquid.

The recording liquid was evaluated for various properties. Table 1 shows the results.

| | |
|---|---|
| The above dispersion | 13.5 parts |
| Dispersing agent ("Emulgen A-90" supplied by Kao Corp.) | 0.2 part |
| Acrylic resin ("W-215" supplied by Nippon Polymer Industry Co., Ltd.) | 1.0 part |
| Ethylene glycol | 10.0 parts |
| Antifungal agent ("Sodium omadine", supplied by Olin Corp.) | 0.15 part |
| Ethylenediamine tetraacetic acid sodium salt | 0.02 part |
| Purified water | 63.53 part |

In addition to a test with "HG5130" supplied by Seiko Epson Corporation, the above recording liquid was placed in a cartridge of "Thinkjet" supplied by Japan Hewlett Packard, Ltd. and used for recording, to give recorded products which were as good as those obtained with "HG5130" supplied by Seiko Epson Corporation and had sufficient water resistance.

EXAMPLE 4-2

250 Parts of a quinacridone pigment ("Hostaperm Pink E", supplied by Hoechst Industry Limited), 2,500 parts of sodium chloride, 10 parts of a red pigment dispersing agent (P—[CH$_2$NH(CH$_2$)$_4$N(CH$_3$)$_2$]$_3$, P=quinacridone residue) and 160 parts of polyethylene glycol 300 (supplied by Tokyo Chemical Industry Co., Ltd.) were charged into a 1-gallon kneader of stainless steel (supplied by Inoue Seisakusho), and kneaded at 60° C. for 3 hours. Then, the resultant mixture was poured into 2.5 liters of warm water, and stirred with a high-speed mixer under heat around 80° C. for about 1 hour to form a slurry. Then, the filtering of the slurry and the washing thereof with water were repeated five times to remove the sodium chloride and the solvent, whereby a water-based pigment dispersion (pigment derivative-treated pigment dispersion) having a solid content of 50% was obtained.

The following materials were placed in a sand mill and dispersed for 3 hours to prepare a concentrated inkjet recording liquid.

| | |
|---|---|
| Red pigment (pigment derivative-treated pigment dispersion, product having a solid content of 50%) | 30.0 parts |
| Acrylic resin aqueous solution ("Joncryl 62" supplied by Johnson Polymer Corp., solid content 31.0%) | 3.0 parts |
| Dispersing agent ("Emulgen A-90" supplied by Kao Corp.) | 1.0 part |
| Purified water | 50.0 parts |
| Glycerin | 6.0 parts |

After the above materials were dispersed, the following components were mixed. Then, the mixture was filtered through a 1-μm membrane filter and then filtered through a 0.45-m membrane filter to give a recording liquid.

The recording liquid was evaluated for various properties. Table 1 shows the results.

| | |
|---|---|
| The above dispersion | 13.5 parts |
| Dispersing agent ("Emulgen A-90" supplied by Kao Corp.) | 0.2 part |
| Acrylic resin emulsion ("w-215" supplied by Nippon Polymer Industry Co., Ltd., solid content 30%) | 1.0 part |
| Ethylene glycol | 10.0 parts |
| Antifungal agent ("Sodium omadine", supplied by Olin Corp.) | 0.15 part |
| Ethylenediamine tetraacetic acid sodium salt | 0.02 part |
| Purified water | 63.53 part |

In addition to a test with "HG5130" supplied by Seiko Epson Corporation, the above recording liquid was placed in a cartridge of "Thinkjet" supplied by Japan Hewlett Packard, Ltd., and used for recording, to give recorded products which were as good as those obtained with "HG51301" supplied by Seiko Epson Corporation and had sufficient water resistance.

EXAMPLE 4-3

An inkjet recording liquid excellent in transparency and durability was obtained in the same manner as in Example 1-3 except that the quinophthalone pigment in Example 1-3 was replaced with 280 parts of a quinacridone pigment ("Hostaperm Pink E" supplied by Hoechst Industry Limited). Table 1 shows the evaluatin results.

Further, in addition to a test with "HG5130" supplied by Seiko Epson Corporation, the above recording liquid was placed in a cartridge of "Thinkjet" supplied by Japan Heulett Packard, Ltd., and used for recording, to give recorded products which were as good as those obtained with "HG5130" supplied by Seiko Epson Corporation and had sufficient water resistance.

COMPARATIVE EXAMPLE 1

The following materials were placed in a paint shaker and dispersed for 8 hours to prepare a concentrated inkjet recording liquid.

| | |
|---|---|
| Red pigment ("Hostaperm Pink E" supplied by Hoechst Industry Limited) | 15.0 parts |
| Acrylic resin aqueous solution ("Joncryl 62" supplied by Johnson Polymer Corp., solid content 34.6%) | 3.0 parts |
| Dispersing agent ("Emulgen A-90" supplied by Kao Corp.) | 1.0 part |
| Purified water | 50.0 parts |
| Glycerin | 6.0 parts |

After the above materials were dispersed, the following components were mixed. Then, the. mixture was filtered through a 1-μm membrane filter to show that the amount of a filtrate was very small as compared with those in Examples 4.

Further, it was very difficult to filter the above mixture through a 0.45-μm membrane filter, and the mixture was not evaluated for a printed state, ejection properties, etc.

| | |
|---|---|
| The above dispersion | 13.5 parts |
| Dispersing agent ("Emulgen A-90" supplied by Kao Corp.) | 0.2 part |
| Acrylic resin emulsion ("W-215" supplied by Nippon Polymer Industry Co., Ltd., solid content 30%) | 1.0 part |
| Ethylene glycol | 10.0 parts |
| Antifungal agent ("Sodium omadine", supplied by Olin Corp.) | 0.15 part |
| Ethylenediamine tetraacetic acid sodium salt | 0.02 part |
| Purified water | 63.53 part |

Even after the above mixture was dispersed for 8 hours, the amunt of a filtrate through a 1-μm membrane filter was very small as compared with those in Examples 4.

Further, it was very difficult to fileter it through a 0.45-μm filter.

EXAMPLE 5-1

A water-based pigment dispersion (treated pigment dispersion) was obtained in the same manner as in Example 1-1 except that the quinophthalone pigment in Example 1-1 was replaced with 260 parts of a perylene pigment ("Hostaperm Red 2GL" supplied by Hoechst Industry Limited) and that the temperature for salt milling was changed from 60° C. to 50° C. Then, an inkjet recording liquid excellent in transparency and ater resistance was obtained in the same manner as in Example 1-1. Table 1 shows the evaluation results.

EXAMPLE 5-2

An inkjet recording liquid excellent in transparency and durability was obtained in the same manner as in Example 1-2 except that the quinophthalone pigment in Example 1-2 was replaced with 260 parts of a perylene pigment ("Hostaperm Red 2GL" supplied by Hoechst Industry Limited) and that the amount of the the yellow pigment dispersing agent was replaced with 25 parts of a red pigment dispersing agent (P—[CH$_2$NH(CH$_2$)$_4$N(CH$_3$)$_2$]$_3$, P=qunacridone residue). Table 1 shows the results.

EXAMPLE 5-3

A water-based pigment dispersion (treated pigment dispersion) was obtained in the same manner as in Example 1-3 except that the quinophthalone pigment in Example 1-3 was replaced with 260 parts of a perylene pigment ("Hostaperm Red 2GL" supplied by Hoechst Industry Limited). Then, an inkjet recording liquid excellent in transparency and water resistance was obtained in the same manner as in Example 1-3. Table 1 shows the evaluation results.

EXAMPLE 6-1

A water-based pigment dispersion (treated pigment o dispersion) was obtained in the same manner as in Example 1-1 except that the quinophthalone pigment in Example 1-1 was replaced with 260 parts of a fused azo pigment ("Chromophthal Yellow 3G" supplied by CIBA). Then, an inkjet recording liquid excellent in transparency and water resistance was obtained in the same manner as in Example 1-1. Table 1 shows the evaluation results.

EXAMPLE 6-2

An inkjet recording liquid excellent in transparency and durability was obtained in the same manner as in Example 1-2 except that the quinophthalone pigment in Example 1-2 was replaced with 260 parts of a fused azo pigment ("Chromophthal Yellow 3G" supplied by CIBA). Table 1 shows the results.

EXAMPLE 6-3

A water-based pigment dispersion (treated pigment dispersion) was obtained in the same manner as in Example 1-3 except that the quinophthalone pigment in Example 1-3 was replaced with 260 of a fused azo pigment ("Chromophthal Yellow 3G" supplied by CIBA). Then, an inkjet recording liquid excellent in transparency and water resistance was obtained in the same manner as in Example 1-3. Table 1 shows the evaluation results.

EXAMPLE 7-1

A water-based pigment dispersion (treated pigment dispersion) was obtained in the same manner as in Example 1-1 except that the quinophthalone pigment in Example 1-1 was replaced with 260 parts of an isoindolinone pigment ("Irgadine Yellow 3RLTN" supplied by CIBA). Then, an inkjet recording liquid excellent in transparency and water resistance was obtained in the same manner as in Example 1-1. Table 1 shows the evaluation results.

EXAMPLE 7-2

An inkjet recording liquid excellent in transparency and durability was obtained in the same manner as in Example 1-2 except that the quinophthalone pigment in Example 1-2 was replaced with 260 parts of an isoindolinone pigment ("Irgadine yellow 3RLTN" supplied by CIBA). Table 1 shows the results.

EXAMPLE 7-3

A water-based pigment dispersion (treated pigment dispersion) was obtained in the same manner as in Example 1-3 except that the quinophthalone pigment in Example 1-3 was replaced with 260 of an isoindolinone pigment ("Irgadine Yellow 3RLTN" supplied by CIBA). Then, an inkjet recording liquid excellent in transparency and water resistance was obtained in the same manner as in Example 1-3. Table 1 shows the evaluation results.

EXAMPLE 8-1

250 Parts of a quinacridone pigment ("Hostaperm Pink E", supplied by Hoechst Industry Limited), 2,500 parts of sodium chloride and 160 parts of polyethylene glycol 300 (supplied by Tokyo Chemical Industry Co., Ltd.) were charged into a 1-gallon kneader of stainless steel (supplied by Inoue Seisakusho), and kneaded at 60° C. for 5 hours. Then, the resultant mixture was poured into 2.5 liters of warm water, and stirred with a high-speed mixer under heat around 80° C. for about 1 hour to form a slurry. Then, the filtering of the slurry and the washing thereof with water were repeated eight times to remove the sodium chloride and the solvent, whereby a water-based pigment dispersion (treated pigment dispersion) having a solid content of 50% was obtained.

The following materials were placed in a sand mill and dispersed for 4 hours to prepare a concentrated inkjet recording liquid.

| | |
|---|---|
| Red pigment (treated pigment dispersion, product having a solid content of 50%) | 30.0 parts |
| Acrylic resin aqueous solution ("Joncryl 62" supplied by Johnson Polymer Corp., solid content 34.6%) | 3.0 parts |
| Dimethylaminoethanol | 0.1 part |
| Dispersing agent ("Emulgen A-90" supplied by Kao Corp.) | 1.0 part |
| Purified water | 50.0 parts |
| Glycerin | 6.0 parts |

After the above materials were dispersed, the following components were mixed. Then, the mixture was filtered through a 1-$\mu$m membrane filter and then filtered through a 0.45-$\mu$m membrane filter to give a recording liquid.

The recording liquid was evaluated for various properties in the same manner as in Examples 1. Table 1 shows the results.

| | |
|---|---|
| The above dispersion | 13.5 parts |
| Dispersing agent ("Emulgen A-90" supplied by Kao Corp.) | 0.2 part |
| Acrylic resin emulsion ("W-215" supplied by Nippon Polymer Industry Co., Ltd., solid content 30%) | 1.0 part |
| Ethylene glycol | 10.0 parts |
| Antifungal agent ("Sodium omadine", supplied by Olin Corp.) | 0.15 part |
| Ethylenediamine tetraacetic acid sodium salt | 0.02 part |
| Purified water | 63.53 part |
| 2,4,7,9-Tetramethyl-5-decyne-4,7-diol | 0.1 part |

EXAMPLE 8-2

250 Parts of a quinacridone pigment ("Hostaperm Pink E", supplied by Hoechst Industry Limited), 2,500 parts of sodium chloride, 10 parts of a red pigment dispersing agent (P—[CH$_2$NH(CH$_2$)$_4$N(CH$_3$)$_2$]$_3$, P=quinacridone residue) and 160 parts of polyethylene glycol 300 (supplied by Tokyo Chemical Industry Co., Ltd.) were charged into a 1-gallon kneader of stainless steel (supplied by Inoue Seisakusho), and kneaded at 60° C. for 3 hours. Then, the resultant mixture was poured into 2.5 liters of warm water, and stirred with a high-speed mixer under heat around 80° C. for about 1 hour to form a slurry. Then, the filtering of the slurry and the washing thereof with water were repeated eight times to remove the sodium chloride and the solvent, whereby a water-based pigment dispersion (pigment derivative-treated pigment dispersion) having a solid content of 50% was obtained.

The following materials were placed in a sand mill and dispersed for 4 hours to prepare a concentrated inkjet recording liquid.

| | |
|---|---|
| Red pigment (pigment derivative-treated pigment dispersion, product having a solid content of 50%) | 30.0 parts |
| Acrylic resin aqueous solution ("Joncryl 62" supplied by Johnson Polymer Corp., solid content 31.0%) | 3.0 parts |
| Dispersing agent ("Emulgen A-90" supplied by Kao Corp.) | 1.0 part |
| Purified water | 50.0 parts |
| Glycerin | 6.0 parts |

After the above materials were dispersed, the following components were mixed. Then, the mixture was filtered through a 1-μm membrane filter and then filtered through a 0.45-μm membrane filter to give a recording liquid.

The recording liquid was evaluated for various properties in the same manner as in Examples 1. Table 1 shows the results.

| | |
|---|---|
| The above dispersion | 13.5 parts |
| Dispersing agent ("Emulgen A-90" supplied by Kao Corp.) | 0.2 part |
| Acrylic resin emulsion ("W-215" supplied by Nippon Polymer Industry Co., Ltd., solid content 30%) | 1.0 part |
| Ethylene glycol | 10.0 parts |
| Antifungal agent ("Sodium omadine", supplied by Olin Corp.) | 0.15 part |
| Ethylenediamine tetraacetic acid sodium salt | 0.02 part |
| Purified water | 63.53 part |

EXAMPLE 8-3

An acryl-treated pigment water-based dispersion having a solid content of 50% was obtained in the same manner as in Example 3-3 except that the naphthol pigment in Example 3-3 was replaced with 280 parts of a quinacridone pigment ("Hostaperm Pink" supplied by Hoechst Industry Limited). The following materials were placed in a sand mill and dispersed for 3 hours.

| | |
|---|---|
| Red pigment (acryl-treated quinacridone pigment water-based dispersion having a solid content of 50%) | 20.0 parts |
| Acrylic resin aqueous solution ("PDX6101" supplied by Johnson Polymer Corp., solid content 40%) | 2.8 parts |
| Surfactant ("Emulgen 420" supplied by Kao Corp.) | 2.1 parts |
| Purified water | 74.5 parts |
| Glycerin | 6.0 parts |

After the above materials were dispersed, the following components were mixed. Then, the mixture was filtered through a 1-m membrane filter and then filtered through a 0.45-μm membrane filter to give a recording liquid.

| | |
|---|---|
| The above dispersion | 13.5 parts |
| Acrylic resin emulsion ("W-215" supplied by Nippon Polymer Industry Co., Ltd., solid content 30%) | 1.0 part |
| Diethylene glycol | 20.0 parts |
| Antifungal agent ("Proxel GXL", supplied by Zeneca K.K.) | 0.15 part |
| Ethylenediamine tetraacetic acid sodium salt | 0.02 part |
| Dimethylaminoethanol | 0.1 part |
| Purified water | 63.53 part |

EXAMPLE 9-1

A treated pigment water-based dispersion having a solid content of 50% was obtained in the same manner as in Example 3-1 except that the naphthol pigment in Example 3-1 was replaced with 280 parts of an insoluble azo pigment (yellow pigment, "Hansa Brilliant Yellow 9GX" supplied by Hoechst Industry Limited).

The following materials were mixed and dispersed with a sand mill for 4 hours to prepare a concentrated inkjet recording liquid.

| | |
|---|---|
| Yellow pigment (treated pigment water-based dispersion having a solid content of 50%) | 55.0 parts |
| Acrylic resin aqueous solution ("Joncryl 61J" supplied by Johnson Polymer Corp., solid content 31.0%) | 7.0 parts |
| Dispersing agent ("Emulgen A-90" supplied by Kao Corp.) | 4.0 parts |
| Purified water | 56.0 parts |
| Diethylene glycol monobutyl ether | 3.0 parts |
| N-Methyl-2-pyrrolidone | 3.0 parts |
| 2,4,7,9-Tetramethyl-5-decyne-4,7-diol | 1.0 part |
| Ethylene glycol | 1.0 part |

After the above materials were dispersed, the following components were mixed. Then, the mixture was filtered through a 1-μm membrane filter and then filtered through a 0.45-μm membrane filter to give a recording liquid. The recording liquid was evaluated in the same manner as in Example 1. Table 1 shows the results.

| | |
|---|---|
| The above dispersion | 13.0 parts |
| Dispersing agent ("Solsperse 27000" supplied by Zeneca K.K.) | 0.2 part |
| Acrylic resin aqueous solution ("Emapoly TYN-40" supplied by Gifu Shellac, solid content 44.8%) | 3.0 parts |
| Diethylaminoethanol | 0.2 part |
| Diethylene glycol | 22.5 parts |
| Antifungal agent ("Proxel GXL", supplied by Zeneca K.K.) | 0.15 part |
| Ethylenediamine tetraacetic acid sodium salt | 0.02 part |
| Purified water | 63.53 parts |
| 2,4,7,9-Tetramethyl-5-decyne-4,7-diol | 0.1 part |

EXAMPLE 9-2

A pigment derivative-treated pigment water-based dispersion having a solid content of 50% was obtained in the same manner as in Example 3-2 except that the naphthol pigment in Example 3-2 was replaced with 280 parts of an insoluble azo pigment (yellow pigment, "Hansa Brilliant Yellow 9GX" supplied by Hoechst Industry Limited).

The following materials were mixed and dispersed With a sand mill for 2 hours to prepare a concentrated inkjet Recording liquid.

| | |
|---|---|
| Yellow pigment (acryl-treated pigment water-based dispersion having a solid content of 50%) | 55.0 parts |
| Acrylic resin aqueous solution ("Joncryl 61J" supplied by Johnson Polymer Corp., solid content 31.0%) | 7.0 parts |
| Dispersing agent ("Emulgen A-90" supplied by Kao Corp.) | 4.0 parts |
| Purified water | 56.0 parts |
| Diethylene glycol monobutyl ether | 3.0 parts |
| N-Methyl-2-pyrrolidone | 3.0 parts |
| 2,4,7,9-Tetramethyl-5-decyne-4,7-diol | 1.0 part |
| Ethylene glycol | 1.0 part |

After the above materials were dispersed, the following components were mixed. Then, the mixture was filtered through a 1-μm membrane filter and then filtered through a 0.45-μm membrane filter to give a recording liquid. The recording liquid was evaluated in the same manner as in Example 1. Table 1 shows the results.

| | |
|---|---|
| The above dispersion | 13.0 parts |
| Dispersing agent ("Solsperse 27000" supplied by Zeneca K.K.) | 0.2 part |
| Acrylic resin emulsion ("W-215" supplied by Nippon Polymer Industry Co., Ltd., solid content 30%) | 1.0 part |
| Diethylene glycol | 22.5 parts |
| Antifungal agent ("Proxel GXL", supplied by Zeneca K.K.) | 0.15 part |
| Ethylenediamine tetraacetic acid sodium salt | 0.02 part |
| Purified water | 63.53 parts |
| 2,4,7,9-Tetramethyl-5-decyne-4,7-diol | 0.1 part |

EXAMPLE 9-3

An acryl-treated pigment water-based dispersion having a solid content of 50% was obtained in the same manner as in Example 3-3 except that the naphthol pigment in Example 3-3 was replaced with 280 parts of an insoluble azo pigment (yellow pigment, "Hansa Brilliant Yellow 9GX" supplied by Hoechst Industry Limited). The following materials were placed in a sand mill and dispersed for 3 hours.

| | |
|---|---|
| Yellow pigment (acryl-treated pigment water-based dispersion having a solid content of 50%) | 55.0 parts |
| Acrylic resin aqueous solution ("Joncryl 61J" supplied by Johnson Polymer Corp., solid content 31.0%) | 7.0 parts |
| Dispersing agent ("Emulgen A-90" supplied by Kao Corp.) | 4.0 parts |
| Purified water | 56.0 parts |
| Diethylene glycol monobutyl ether | 3.0 parts |
| N-Methyl-2-pyrrolidone | 3.0 parts |
| 2,4,7,9-Tetramethyl-5-decyne-4,7-diol | 1.0 part |
| Ethylene glycol | 1.0 part |

After the above materials were dispersed, the following components were mixed. Then, the mixture was filtered through a 1-μm membrane filter and then filtered through a 0.45μm membrane filter to give a recording liquid. Table 1 shows the evaluation results.

| | |
|---|---|
| The above dispersion | 13.0 parts |
| Dispersing agent ("Solsperse 27000" supplied by Zeneca K.K.) | 0.2 part |
| Acrylic resin emulsion ("W-215" supplied by Nippon Polymer Industry Co., Ltd.) | 1.0 part |
| Diethylene glycol | 22.5 parts |
| Antifungal agent ("Proxel GXL", supplied by Zeneca K.K.) | 0.15 part |
| Ethylenediamine tetraacetic acid sodium salt | 0.02 part |
| Purified water | 63.53 parts |
| 2,4,7,9-Tetramethyl-5-decyne-4,7-diol | 0.1 part |

COMPARATIVE EXAMPLE 2

A concentrated inkjet recording liquid and a recording liquid were prepared in the same manner as in Example 1-1 except that the salt-milling temperature was changed from 60° C. to 120° C. Table 2 shows the evaluation results.

COMPARATIVE EXAMPLE 3

A concentrated inkjet recording liquid and a recording liquid were prepared in the same manner as in Example 1-2 except that the quinophthalone pigment was replaced with a benzimidazolone pigment ("Hostaperm Yellow H3G" supplied by Hoechst Industry Limited) and that the salt-milling temperature was changed from 60° C. to 120° C. Table 2 shows the evaluation results.

COMPARATIVE EXAMPLE 4

A concentrated inkjet recording liquid and a recording liquid were prepared in the same manner as in Example 1-3 except that the quinophthalone pigment was replaced with a quinacridone pigment ("Hostaperm Pink E" supplied by Hoechst Industry Limited) and that the salt-milling temperature was changed from 60° C. to 150° C. Table 2 shows the evaluation results.

COMPARATIVE EXAMPLE 5

A concentrated inkjet recording liquid and a recording liquid were prepared in the same manner as in Example 1-1 except that the quinophthalone pigment was replaced with a naphthol pigment ("Permanent Red F4R" supplied by Hoechst Industry Limited) and that the salt-milling temperature was changed from 60° C. to 80° C. Table 2 shows the evaluation results.

COMPARATIVE EXAMPLE 6

A concentrated inkjet recording liquid and a recording liquid were prepared in the same manner as in Example 1-1 except that the quinophthalone pigment was replaced with a perylene pigment ("Hostaperm Red P2GL" supplied by Hoechst Industry Limited) and that the salt-milling temperature was changed from 60° C. to 100° C. . Table 2 shows the evaluation results.

COMPARATIVE EXAMPLE 7

A concentrated inkjet recording liquid and a recording liquid were prepared in the same manner as in Example 1-1 except that the quinophthalone pigment was replaced with a fused azo pigment ("Chromophthal Yellow 3G" supplied by CIBA) and that the salt-milling temperature was changed from 60° C. to 120° C. Table 2 shows the evaluation results.

COMPARATIVE EXAMPLE 8

A concentrated inkjet recording liquid and a recording liquid were prepared in the same manner as in Example 1-1 except that the quinophthalone pigment was replaced with an isoindolinone pigment ("Irgadine Yellow 3RLTN"supplied by CIBA) and that the salt-milling temperature was changed from 60° C. to 120° C. Table 2 shows the evaluation results.

EXAMPLE 10

250 Parts of a quinacridone pigment ("Hostaperm Pink E", supplied by Hoechst Industry Limited), 8 parts of a pigment derivative (P—[CH$_2$NH(CH$_2$)$_4$N(C$_2$H$_5$)$_2$]$_2$, P=quinacridone residue), 2,500 parts of sodium chloride and 160 parts of polyethylene glycol 300 (supplied by Tokyo Chemical Industry Co., Ltd.) were charged into a 1-gallon kneader of stainless steel (supplied by Inoue Seisakusho), and kneaded at 60° C. for 3 hours. Then, the resultant mixture was poured into 2.5 liters of warm water, and stirred with a high-speed mixer under heat around 80° C. for about 1 hour to form a slurry. Then, the filtering of the slurry and the washing thereof with water were repeated five times to remove the sodium chloride and the solvent, whereby a water-based pigment dispersion (treated pigment dispersion) having a solid content of 50% was obtained.

The following materials were placed in a paint shaker and dispersed for 4 hours to prepare a concentrated inkjet recording liquid.

| | |
|---|---|
| Red pigment (treated pigment dispersion, product having a solid content of 50%) | 30.0 parts |
| Acrylic resin aqueous solution ("Joncryl 62" supplied by Johnson Polymer Corp., solid content 31.0%) | 3.0 parts |
| Dispersing agent ("Emulgen A-90" supplied by Kao Corp.) | 1.0 part |
| Purified water | 50.0 parts |
| Glycerin | 6.0 parts |

After the above materials were dispersed, the following components were mixed. Then, the mixture was filtered through a 1-μm membrane filter and then filtered through a 0.45-μm membrane filter to give a recording liquid.

The recording liquid was evaluated for various properties in the same manner as in Example 1. Table 1 shows the results.

| | |
|---|---|
| The above dispersion | 13.5 parts |
| Dispersing agent ("Emulgen A-90" supplied by Kao Corp.) | 0.2 part |
| Acrylic resin emulsion ("W-215" supplied by Nippon Polymer Industry Co., Ltd.) | 1.0 part |
| Diethylaminoethanol | 0.1 part |
| Ethylene glycol | 10.0 parts |
| Antifungal agent ("Sodium omadine", supplied by Olin Corp.) | 0.15 part |
| Ethylenediamine tetraacetic acid sodium salt | 0.02 part |
| Purified water | 63.53 part |

Further, in addition to a test with "HG5130" supplied by Seiko Epson Corporation, the above recording liquid was placed in a cartridge of "Thinkjet" supplied by Japan Hewlett Packard Ltd., and used for recording, to give recorded products which were as good as those obtained with "HG5130" supplied by Seiko Epson Corporation and had sufficient water resistance.

COMPARATIVE EXAMPLE 9

The following materials were placed in a paint shaker and dispersed for 8 hours to prepare a concentrated inkjet recording liquid.

| | |
|---|---|
| Red pigment ("Hostaperm Pink E", supplied by Hoechst Industry Limited), | 15.0 parts |
| Acrylic resin aqueous solution ("Joncryl 62" supplied by Johnson Polymer Corp., solid content 31.0%) | 3.0 parts |
| Dispersing agent ("Emulgen A-90" supplied by Kao Corp.) | 1.0 part |
| Purified water | 50.0 parts |
| Glycerin | 6.0 parts |

After the above materials were dispersed, the following components were mixed. Then, the mixture was filtered through a 1-μm membrane filter to show that the amount of a filtrate was very small as compared with that in Example 8.

Further, it was very difficult to filter the above mixture through a 0.45-μm membrane filter, and the mixture was not evaluated for a printed state, ejection properties, etc.

| | |
|---|---|
| The above dispersion | 13.5 parts |
| Dispersing agent ("Emulgen A-90" supplied by Kao Corp.) | 0.2 part |
| Acrylic resin emulsion ("W-215" supplied by Nippon Polymer Industry Co., Ltd.) | 1.0 part |
| Diethylaminoethanol | 0.1 part |
| Ethylene glycol | 10.0 parts |
| Antifungal agent ("Sodium omadine", supplied by Olin Corp.) | 0.15 part |
| Ethylenediaminetetraacetic acid sodium salt | 0.02 part |
| Purified water | 63.53 part |

EXAMPLE 11

250 Parts of a quinacridone pigment ("Hostaperm Pink E", supplied by Hoechst Industry Limited), 12 parts of one of the following pigment derivatives (q~λ), 2,500 parts of sodium chloride, and 160 parts of polyethylene glycol 300 (supplied by Tokyo Chemical Industry Co., Ltd.) were charged into a 1-gallon kneader of stainless steel (supplied by Inoue Seisakusho), and kneaded at 60° C. for 3 hours. Then, the resultant mixture was poured into 2.5 liters of warm water, and stirred with a high-speed mixer under heat around 80° C. for about 1 hour to form a slurry. Then, the filtering of the slurry and the washing thereof with water were repeated five times to remove the sodium chloride and the solvent, whereby a water-based pigment dispersion (treated pigment dispersion) having a solid content of 50% was obtained.

Pigment derivative a

| Organic pigment residue | Substituent |
|---|---|
| C.I. Pigment Violet 19 | 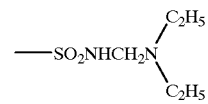 |

Pigment derivative b

| Organic pigment residue | Substituent |
|---|---|
| C.I. Pigment Violet 19 | 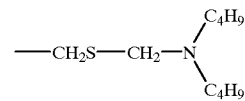 |

Pigment derivative c

| Organic pigment residue | Substituent |
|---|---|
| C.I. Pigment Violet 19 | 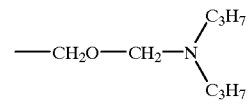 |

Pigment derivative d

| Organic pigment residue | Substituent |
|---|---|
| C.I. Pigment Violet 19 | 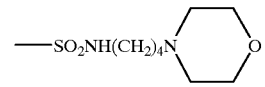 |

-continued

| Pigment derivative e | |
|---|---|
| Organic pigment residue | Substituent |
| C.I. Pigment Violet 19 | —SO$_2$NH(CH$_2$)$_3$N(morpholine) |

| Pigment derivative f | |
|---|---|
| Organic pigment residue | Substituent |
| C.I. Pigment Red 168 | —SO$_2$NH(CH$_2$)$_3$N(C$_3$H$_7$)$_2$ |

| Pigment derivative g | |
|---|---|
| Organic pigment residue | Substituent |
| C.I. Pigment Red 254 | —SO$_2$NH(CH$_2$)$_3$N(CH$_3$)$_2$ |

| Pigment derivative h | |
|---|---|
| Organic pigment residue | Substituent |
| C.I. Pigment Red 2 | —CONH(CH$_2$)$_3$N(C$_4$H$_9$)$_2$ |

| Pigment derivative i | |
|---|---|
| Organic pigment residue | Substituent |
| C.I. Pigment Violet 19 | —CONH(CH$_2$)$_3$N(C$_4$H$_9$)$_2$ |

| Pigment derivative j | |
|---|---|
| Organic pigment residue | Substituent |
| C.I. Pigment Violet 19 | —SO$_2$NH(CH$_2$)$_3$N(C$_4$H$_9$)$_2$ |

| Pigment derivative k | |
|---|---|
| Organic pigment residue | Substituent |
| C.I. Pigment Orange 43 | —CH$_2$N(CH$_3$)(CH$_2$)$_3$NH(C$_{18}$H$_{37}$) |

| Pigment derivative l | |
|---|---|
| Organic pigment residue | Substituent |
| C.I. Pigment Red 83 | —SO$_2$NH(CH$_2$)$_2$N(CH$_3$)$_2$ |

The following materials were placed in a paint shaker and dispersed for 4 hours to prepare a concentrated inkjet recording liquid.

| | |
|---|---|
| Red pigment (treated pigment dispersion, product having a solid content of 50%) | 30.0 parts |
| Acrylic resin aqueous solution ("Joncryl 62" supplied by Johnson Polymer Corp., solid content 31.0%) | 3.0 parts |
| Dispersing agent ("Emulgen A-90" supplied by Kao Corp.) | 1.0 part |
| Purified water | 50.0 parts |
| Glycerin | 6.0 parts |

After the above materials were dispersed, the following components were mixed. Then, the mixture was filtered through a 1-μm membrane filter and then filtered through a 0.45-μm membrane filter to give a recording liquid.

The recording liquid was evaluated for various properties in the same manner as in Examples 1. Table 3 shows the results.

| | |
|---|---|
| The above dispersion | 13.5 parts |
| Dispersing agent ("Emulgen 420" supplied by Kao Corp.) | 0.2 part |
| Acrylic resin emulsion ("W-215" supplied by Nippon Polymer Industry Co., Ltd.) | 1.0 part |
| Ethylene glycol | 10.0 parts |
| Glycerin | 10.0 parts |
| Antifungal agent ("Sodium omadine", supplied by Olin Corp.) | 0.15 part |

-continued

| | |
|---|---|
| Ethylenediamine tetraacetic acid sodium salt | 0.02 part |
| Purified water | 63.53 part |

Further, in addition to a test with "HG5130" supplied by Seiko Epson Corporation, the above recording liquid was laced in a cartridge of "Thinkjet" supplied by Japan Hewlett Packard Ltd., and used for recording, to give recorded products which were as good as those obtained with "HG5130" supplied by Seiko Epson Corporation and had sufficient water resistance.

EXAMPLE 12

260 Parts of a benzimidazolone pigment (yellow pigment, "Hostaperm Yellow H3G", supplied by Hoechst Industry limited), 12 parts of one of the following pigment derivatives (m~s), 2,500 parts of sodium chloride, and 160 parts of polyethylene glycol 300 (supplied by Tokyo Chemical Industry Co., Ltd.) were charged into a 1-gallon kneader of stainless steel (supplied by Inoue Seisakusho), and kneaded at 50° C. for 3 hours. Then, the resultant mixture was poured into 2.5 liters of warm water, and stirred with a high-speed mixer under heat around 80° C. for about 1 hour to form a slurry. Then, the filtering of the slurry and the washing thereof with water were repeated five times to remove the sodium chloride and the solvent, whereby a water-based pigment dispersion (treated pigment dispersion) having a solid content of 50% was obtained.

| Pigment derivative m | |
|---|---|
| Organic pigment residue | Substituent |
| C.I. Pigment Yellow 24 | —SO$_2$NH(CH$_2$)$_2$N(CH$_3$)$_2$ |

| Pigment derivative n | |
|---|---|
| Organic pigment residue | Substituent |
| C.I. Pigment Yellow 24 | —CH$_2$S—CH$_2$N(C$_3$H$_7$)$_2$ |

| Pigment derivative o | |
|---|---|
| Organic pigment residue | Substituent |
| C.I. Pigment Yellow 108 | —CH$_2$O—CH$_2$N(C$_2$H$_5$)$_2$ |

| Pigment derivative p | |
|---|---|
| Organic pigment residue | Substituent |
| C.I. Pigment Yellow 108 | —SO$_2$NHCH$_2$N(morpholine) |

| Pigment derivative q | |
|---|---|
| Organic pigment residue | Substituent |
| C.I. Pigment Yellow 83 | —SO$_2$NH(CH$_2$)$_3$N(C$_2$H$_5$)$_2$ |

-continued

Pigment derivative r

Organic pigment residue    Substituent

C.I. Pigment Yellow 108

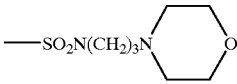
—SO$_2$N(CH$_2$)$_3$N⟨O⟩

Pigment derivative s

Organic pigment residue    Substituent

C.I. Pigment Yellow 24

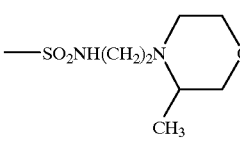
—SO$_2$NH(CH$_2$)$_2$N⟨O⟩ with CH$_3$

The following materials were placed in a sand mill and dispersed for 4 hours to prepare a concentrated inkjet recording liquid.

| | |
|---|---|
| Yellow pigment (treated pigment dispersion, product having a solid content of 50%) | 30.0 parts |
| Acrylic resin aqueous solution ("Joncryl 62" supplied by Johnson Polymer Corp., solid content 31.0%) | 4.0 parts |
| Dispersing agent ("Emulgen A-90" supplied by Kao Corp.) | 1.5 parts |
| Purified water | 50.0 parts |
| Glycerin | 6.0 parts |

After the above materials were dispersed, the following components were mixed. Then, the mixture was filtered through a 1-μm membrane filter and then filtered through a 0.45-μm membrane filter to give a recording liquid.

The recording liquid was evaluated for various properties in the same manner as in Examples 1. Table 4 shows the results.

| | |
|---|---|
| The above dispersion | 13.5 parts |
| Dispersing agent ("Emulgen A-90" supplied by Kao Corp.) | 0.2 part |
| Acrylic resin emulsion ("W-215" supplied by Nippon Polymer Industry Co., Ltd.) | 1.0 part |
| Ethylene glycol | 10.0 parts |
| Glycerin | 10.0 parts |
| Dimethylaminoethanol | 0.1 part |
| Antifungal agent ("Sodium omadine", supplied by Olin Corp.) | 0.15 part |
| Ethylenediamine tetraacetic acid sodium salt | 0.02 part |
| Purified water | 63.53 part |

Further, in addition to a test with "HG5130" supplied by Seiko Epson Corporation, the above recording liquid was placed in a cartridge of "Thinkjet" supplied by Japan Hewlett Packard Ltd., and used for recording, to give recorded products which were as good as those obtained with "HG5130" supplied by Seiko Epson Corporation and had sufficient water resistance.

TABLE 1

| | Dispersing time (hour) | | Filterability (l) | | Viscosity | Particle diameter |
|---|---|---|---|---|---|---|
| | 1* | 2* | 1.0μ | 0.45μ | CPS | nm |
| Ex. 1-1 | 4 | 4 | 1 or more | 0.7 | 2.0 | 85 |
| Ex. 1-2 | 4 | 4 | 1 or more | 0.8 | 1.9 | 80 |
| Ex. 1-3 | 3 | 3 | 1 or more | 0.8 | 1.8 | 78 |
| Ex. 2-1 | 4 | 5 | 1 or more | 0.5 | 2.9 | 125 |
| Ex. 2-2 | 4 | 4 | 1 or more | 0.6 | 1.8 | 112 |
| Ex. 2-3 | 3 | 3 | 1 or more | 0.7 | 1.8 | 105 |
| Ex. 3-1 | 5 | 4 | 1 or more | 0.6 | 2.5 | 120 |
| Ex. 3-2 | 5 | 4 | 1 or more | 0.7 | 2.3 | 110 |
| Ex. 3-3 | 5 | 4 | 1 or more | 0.8 | 2.0 | 105 |
| Ex. 4-1 | 3 | 4 | 1 or more | 0.5 | 1.7 | 122 |
| Ex. 4-2 | 3 | 3 | 1 or more | 0.6 | 1.8 | 103 |
| Ex. 4-3 | 3 | 3 | 1 or more | 0.8 | 1.8 | 92 |
| Ex. 5-1 | 4 | 4 | 1 or more | 0.6 | 2.0 | 113 |
| Ex. 5-2 | 4 | 4 | 1 or more | 0.6 | 1.9 | 108 |
| Ex. 5-3 | 3 | 3 | 1 or more | 0.7 | 1.9 | 103 |
| Ex. 6-1 | 4 | 4 | 1 or more | 0.8 | 1.8 | 92 |
| Ex. 6-2 | 4 | 4 | 1 or more | 0.8 | 1.6 | 85 |
| Ex. 6-3 | 3 | 3 | 1 or more | 0.9 | 1.6 | 85 |
| Ex. 7-1 | 4 | 4 | 1 or more | 0.5 | 2.5 | 130 |
| Ex. 7-2 | 4 | 4 | 1 or more | 0.6 | 2.3 | 105 |
| Ex. 7-3 | 3 | 3 | 1 or more | 0.6 | 2.0 | 102 |
| Ex. 8-1 | 5 | 4 | 1 or more | 0.7 | 1.7 | 118 |
| Ex. 8-2 | 3 | 4 | 1 or more | 0.7 | 2.6 | 100 |
| Ex. 8-3 | 5 | 3 | 1 or more | 0.8 | 1.7 | 98 |
| Ex. 9-1 | 5 | 4 | 1 or more | 0.6 | 2.6 | 115 |
| Ex. 9-2 | 3 | 2 | 1 or more | 0.7 | 2.6 | 109 |
| Ex. 9-3 | 5 | 3 | 1 or more | 0.87 | 2.6 | 109 |

Ex. = Example
Dispensing time 1*: Salt milling time
Dispensing time 2*: Time for treatment with sand mill or paint shaker

| | Printed state | Water resistance | | Trans- parency | Ejection properties |
|---|---|---|---|---|---|
| | | 1* | 2* | | |
| Ex. 1-1 | Good | Good | Good | Good | Good |
| Ex. 1-2 | Good | Good | Good | Good | Good |
| Ex. 1-3 | Good | Good | Good | Good | Good |
| Ex. 2-1 | Good | Good | Good | Good | Good |
| Ex. 2-2 | Good | Good | Good | Good | Good |
| Ex. 2-3 | Good | Good | Good | Good | Good |
| Ex. 3-1 | Good | Good | Good | Good | Good |
| Ex. 3-2 | Good | Good | Good | Good | Good |
| Ex. 3-3 | Good | Good | Good | Good | Good |
| Ex. 4-1 | Good | Good | Good | Good | Good |
| Ex. 4-2 | Good | Good | Good | Good | Good |

TABLE 1-continued

| | | | | | |
|---|---|---|---|---|---|
| Ex. 4-3 | Good | Good | Good | Good | Good |
| Ex. 5-1 | Good | Good | Good | Good | Good |
| Ex. 5-2 | Good | Good | Good | Good | Good |
| Ex. 5-3 | Good | Good | Good | Good | Good |
| Ex. 6-1 | Good | Good | Good | Good | Good |
| Ex. 6-2 | Good | Good | Good | Good | Good |
| Ex. 6-3 | Good | Good | Good | Good | Good |
| Ex. 7-1 | Good | Good | Good | Good | Good |
| Ex. 7-2 | Good | Good | Good | Good | Good |
| Ex. 7-3 | Good | Good | Good | Good | Good |
| Ex. 8-1 | Good | Good | Good | Good | Good |
| Ex. 8-2 | Good | Good | Good | Good | Good |
| Ex. 8-3 | Good | Good | Good | Good | Good |
| Ex. 9-1 | Good | Good | Good | Good | Good |
| Ex. 9-2 | Good | Good | Good | Good | Good |
| Ex. 9-3 | Good | Good | Good | Good | Good |

Ex. = Example,
Water resistance 1*: Water was dropped on recorded product.
Water resistance 2*: Recorded product was immersed in water.

TABLE 2

| | Dispersing time (hour) | | Filterability (l) | | Viscosity | Particle diameter |
|---|---|---|---|---|---|---|
| | 1* | 2* | 1.0μ | 0.45μ | CPS | nm |
| CEx. 1 | — | 8 | 0.03 | Defective | | 309 |
| CEx. 2 | 4 | 4 | 0.8 | 0.3 | 2.3 | 155 |
| CEx. 3 | 4 | 4 | 0.7 | 0.2 | 2.6 | 204 |
| CEx. 4 | 3 | 3 | 0.9 | 0.4 | 2.2 | 143 |
| CEx. 5 | 4 | 4 | 0.8 | 0.4 | 2.4 | 160 |
| CEx. 6 | 4 | 4 | 0.7 | 0.3 | 2.0 | 156 |
| CEx. 7 | 4 | 4 | 0.6 | 0.2 | 2.5 | 135 |
| CEx. 8 | 4 | 4 | 0.6 | 0.3 | 2.2 | 154 |
| CEx. 9 | — | 7 | 0.5 | 0.3 | | |
| Ex. 10 | 4 | 4 | 1 or more | 0.5 | 1.7 | 122 |

CEx. = Comparative Example
Dispersing time 1*: Salt milling time
Dispersing time 2*: Time for treatment with sandmill or paint shaker

| | Printed state | Water resistance | | Trans-parency | Ejection properties |
|---|---|---|---|---|---|
| | | 1* | 2* | | |
| CEx. 1 | | | | | |
| CEx. 2 | Good | Good | Good | Defective | Defective |
| CEx. 3 | Good | Good | Good | Defective | Defective |
| CEx. 4 | Good | Good | Good | Defective | Defective |
| CEx. 5 | Good | Good | Good | Defective | Defective |
| CEX. 6 | Good | Good | Good | Defective | Defective |
| CEX. 7 | Good | Good | Good | Defective | Defective |
| CEx. 8 | Good | Good | Good | Defective | Defective |
| CEx. 9 | | | | | |
| Ex. 10 | Good | Good | Good | Good | Good |

CEx. = Comparative Example
Water resistance 1*: Water was dropped on recorded product.
Water resistance 2*: Recorded product was immersed in water.

TABLE 3

| | Pigment deriva-tive | Dispersing time (hour) | | Filter-ability (l) | | Viscosity | Particle diameter |
|---|---|---|---|---|---|---|---|
| | | 1* | 2* | 1.0μ | 0.45μ | CPS | nm |
| Ex. 11 | a | 4 | 4 | 1 or more | 0.6 | 2.4 | 89 |
| | b | 4 | 4 | 1 or more | 0.7 | 2.6 | 91 |
| | c | 4 | 4 | 1 or more | 0.6 | 2.7 | 95 |
| | d | 4 | 4 | 1 or more | 0.6 | 2.6 | 88 |
| | e | 4 | 4 | 1 or more | 0.7 | 2.7 | 96 |
| | f | 4 | 4 | 1 or more | 0.7 | 2.6 | 90 |
| | g | 4 | 4 | 1 or more | 0.8 | 2.6 | 93 |
| | h | 4 | 4 | 1 or more | 0.9 | 2.6 | 95 |
| | i | 4 | 4 | 1 or more | 0.8 | 2.5 | 89 |
| | j | 4 | 4 | 1 or more | 0.8 | 2.6 | 87 |
| | k | 4 | 4 | 1 or more | 0.8 | 2.6 | 88 |
| | l | 4 | 4 | 1 or more | 0.8 | 2.6 | 90 |

Ex. = Example
Dispensing time 1*: Salt milling time
Dispensing time 2*: Time for treatment with sand mill or paint shaker

| | Pigment deriva-tive | Printed state | Water resistance | | Trans-parency | Ejection properties |
|---|---|---|---|---|---|---|
| | | | 1* | 2* | | |
| Ex. 11 | a | Good | Good | Good | Good | Good |
| | b | Good | Good | Good | Good | Good |
| | c | Good | Good | Good | Good | Good |
| | d | Good | Good | Good | Good | Good |
| | e | Good | Good | Good | Good | Good |
| | f | Good | Good | Good | Good | Good |
| | g | Good | Good | Good | Good | Good |
| | h | Good | Good | Good | Good | Good |
| | i | Good | Good | Good | Good | Good |
| | j | Good | Good | Good | Good | Good |
| | k | Good | Good | Good | Good | Good |
| | l | Good | Good | Good | Good | Good |

Ex. = Example
Water resistance 1*: Water was dropped on recorded product.
Water resistance 2*: Recorded product was immersed in water.

TABLE 4

| | Pigment deriva-tive | Dispersing time (hour) | | Filter-ability (l) | | Viscosity | Particle diameter |
|---|---|---|---|---|---|---|---|
| | | 1* | 2* | 1.0μ | 0.45μ | CPS | nm |
| Ex. 12 | m | 4 | 3 | 1 or more | 0.7 | 2.3 | 108 |
| | n | 4 | 3 | 1 or more | 0.6 | 2.5 | 109 |
| | o | 4 | 3 | 1 or more | 0.6 | 2.5 | 99 |
| | p | 4 | 3 | 1 or more | 0.6 | 2.6 | 110 |
| | q | 4 | 3 | 1 or more | 0.7 | 2.4 | 99 |
| | r | 4 | 3 | 1 or more | 0.7 | 2.5 | 100 |
| | s | 4 | 3 | 1 or more | 0.8 | 2.5 | 98 |

Ex. = Example
Dispensing time 1*: salt miiling time
Dispensing time 2*: Time for treatment with sand mill or paint shaker

TABLE 4-continued

| | Pigment derivative | Printed state | Water resistance 1* | Water resistance 2* | Transparency | Ejection properties |
|---|---|---|---|---|---|---|
| Ex. 12 | m | Good | Good | Good | Good | Good |
| | n | Good | Good | Good | Good | Good |
| | o | Good | Good | Good | Good | Good |
| | p | Good | Good | Good | Good | Good |
| | q | Good | Good | Good | Good | Good |
| | r | Good | Good | Good | Good | Good |
| | s | Good | Good | Good | Good | Good |

Ex. = Example
Water resistance 1*: Water was dropped on recorded product.
Water resistance 2*: Recorded product was immersed in water.

Further, parts of the recording liquids obtained in Examples 1 to 12 were stored at −40° C. for 1 week, parts of the recording liquids obtained in Examples 1 to 11 were stored at a constant-temperature chamber at 60° C. for 1 month, and parts of the recording liquids obtained in Examples 1 to 11 were stored at −40° C. for 3 hours, temperature-increased to 60° C.over 3 hours, maintained at 60° C. for 3 hours, cooled to −40 ° C. over 3 hours and repeatedly tested in this manner for 3 days. In all of these cases, no precipitate occurred, and all the recording liquids retained their initial viscosities and showed stable ejection properties.

EXAMPLE 13

250 Parts of a fused azo pigment ("Chromophthal Yellow 3G" supplied by CIBA), 2,500 parts of sodium chloride, 50 parts of maleated rosin ("Markyd #33", supplied by Araka Chemical Co., Ltd.) and 200 parts of diethylene glycol (supplied by Tokyo Chemical Industry Co., Ltd.) were charged into a 1-gallon kneader of stainless steel (supplied by Inoue Seisakusho), and kneaded at 60° C. for 3 hours. Then, the resultant mixture was poured into 2.5 liters of warm water, and stirred with a high-speed mixer under heat around 80° C. for about 1 hour to form a slurry. Then, the filtering of the slurry and the washing thereof with water were repeated five times to remove the sodium chloride and the solvent, whereby a water-based pigment dispersion (rosin-treated pigment dispersion) having a solid content of 50% was obtained.

The following materials were placed in a sand mill and dispersed for 4 hours to prepare a concentrated inkjet recording liquid.

| | |
|---|---|
| Red pigment (rosin-treated pigment dispersion, product having a solid content of 50%) | 30.0 parts |
| Acrylic resin aqueous solution ("Joncryl 61J" supplied by Johnson Polymer Corp., solid content 31.0%) | 3.0 parts |
| Dimethylaminoethanol | 0.1 part |
| Dispersing agent ("Emulgen 420" supplied by Kao Corp.) | 1.0 part |
| Purified water | 50.0 parts |
| Glycerin | 6.0 parts |

After the above materials were dispersed, the following components were mixed. Then, the mixture was filtered through a 1-μm membrane filter and then filtered through a 0.45-μm membrane filter to give a recording liquid.

| | |
|---|---|
| The above dispersion | 13.5 parts |
| Dispersing agent ("Emulgen 420" supplied by Kao Corp.) | 0.2 part |
| Acrylic resin emulsion ("W-215" supplied by Nippon Polymer Industry Co., Ltd.) | 1.0 part |
| Ethylene glycol | 10.0 parts |
| Antifungal agent ("Sodium omadine", supplied by Olin Corp.) | 0.15 part |
| Ethylenediamine tetraacetic acid sodium salt | 0.02 part |
| Purified water | 63.53 part |

EXAMPLE 14

A water-based dispersion (rosin-treated pigment dispersion) was obtained in the same manner as in Example 13 except that the fused azo pigment in Example 13 was replaced with 260 parts of a quinophthalone pigment ("Pariotol Yellow K0961HD" supplied by BASF). Then, a concentrated inkjet recording liquid was obtained in the same manner as in Example 13. An inkjet recording liquid excellent in transparency and water resistance was obtained. Table 5 shows the evaluation results.

COMPARATIVE EXAMPLE 10

A water-based dispersion (rosin-treated pigment dispersion) was obtained in the same manner as in Example 13 except that the salt-milling temperature was changed from 60° C. to 120° C. Then, a concentrated inkjet recording liquid was obtained in the same manner as in Example 13. An inkjet recording liquid excellent in transparency and water resistance was obtained. Table 5 shows the evaluation results.

EXAMPLE 15

250 Parts of an insoluble azo pigment ("Hansa Brilliant Yellow 9GX" supplied by Hoechst Industry Limited), 900 parts of sodium chloride, 100 parts of disproportionation rosin ("Ronjis", supplied by Arakawa Chemical Co., Ltd.) and 200 parts of polyethylene glycol ("Polyethylene Glycol 300" supplied by Tokyo Chemical Industry Co., Ltd.) were charged into the same kneader as that used in Example 13, and kneaded at 500° C. for 2 hours. Then, the resultant mixture was treated in the same manner as in Example 13 to give a rosin-treated pigment water-based dispersion having a solid content of 50%.

The following materials were placed in a sand mill and dispersed for 3 hours to prepare a concentrated inkjet recording liquid.

| | |
|---|---|
| Yellow pigment (rosin-treated pigment dispersion, product having a solid content of 50%) | 30.0 parts |
| Acrylic resin emulsion ("F-157" supplied by Nippon Polymer Industry Co., Ltd.) | 1.3 parts |
| Aqueous ammonia (10%) | 0.3 part |
| Dispersing agent ("Solsperse 27000" supplied by Zeneca K.K.) | 0.5 part |
| Purified water | 74.0 parts |
| Glycerin | 5.8 parts |
| Dimethylethanolamine | 0.1 part |

After the above materials were dispersed, the following components were mixed. Then, the mixture was filtered through a 3-μm membrane filter and then filtered through a 1-μm membrane filter to give a recording liquid.

| | |
|---|---|
| The above dispersion | 25.0 parts |
| Glycerin | 10.0 parts |
| Antifungal agent ("Sodium omadine", supplied by Olin Corp.) | 0.15 part |
| Ethylenediamine tetraacetic acid sodium salt | 0.02 part |
| Diethylene glycol monobutyl ether | 0.5 part |
| Silicon emulsion type aqueous antifoamer ("Antifoam E20", supplied by kao Corp.) | 0.8 part |

EXAMPLE 16

An inkjet recording liquid excellent in transparency and water resistance was obtained in the same manner as in Example 13 except that the fused azo pigment in Example 13 was replaced with 280 parts of a quinacridone pigment ("Hostaperm Pink E" supplied by Hoechst Industry Limited).

Further, in addition to a test with HG5130 supplied Seiko Epson Corporation, the above recording liquid was placed in a cartridge of "Thinkjet" supplied by Japan Hewlett packard Ltd., and used for recording, to give recorded products Which were as good as those obtained with "HG5130" supplied by Seiko Epson Corporation and had sufficient water resistance.

EXAMPLE 17

A rosin-treated pigment water-based dispersion having a solid content of 50% was obtained in the same manner as in Example 15 except that the insoluble azo pigment in Example 15 was replaced with 280 parts of a naphthol pigment ("Permanent Red F4R" supplied by Hoechst Industry Limited). This dispersion was placed in a sand mill together with the following materials and the mixture was dispersed for 3 hours.

| | |
|---|---|
| Red pigment (rosin-treated pigment dispersion, product having a solid content of 50%) | 20.0 parts |
| Acrylic resin aqueous solution ("PDX6101" supplied by Johnson Polymer Corp.) | 2.8 parts |
| Surfactant ("Emulgen 420" supplied by Kao Corp.) | 2.1 parts |
| Purified water | 74.5 parts |
| Glycerin | 6.0 parts |

After the above materials were dispersed, the following components were mixed. Then, the mixture was filtered through a 1-μm membrane filter and then filtered through a 0.45-μm membrane filter to give a recording liquid.

| | |
|---|---|
| The above dispersion | 13.5 parts |
| Acrylic resin emulsion ("W-215" supplied by Nippon Polymer Industry Co., Ltd.) | 1.0 part |
| Diethylene glycol | 20.0 parts |
| Antifungal agent ("Proxel GXL", supplied by Zeneca K.K.) | 0.15 part |
| Ethylenediamine tetraacetic acid sodium salt | 0.02 part |
| Dimethylaminoethanol | 0.1 part |
| Purified water | 63.53 parts |

EXAMPLE 18

A rosin-treated pigment water-based dispersion having a solid content of 50% was obtained in the same manner as in Example 15 except that the insoluble azo pigment in Example 15 was replaced with 280 parts of a perylene pigment ("Hostaperm Red P2GL" supplied by Hoechst Industry Limited). This dispersion was placed in a sand mill together with the following materials and the mixture was dispersed for 3 hours.

| | |
|---|---|
| Red pigment (rosin-treated pigment dispersion, product having a solid content of 50%) | 55.0 parts |
| Acrylic resin aqueous solution ("Joncryl 61J" supplied by Johnson Polymer Corp.) | 7.0 parts |
| Dispersing agent ("Emulgen A-90" supplied by Kao Corp.) | 4.0 parts |
| Purified water | 56.0 parts |
| Diethylene glycol monobutyl ether | 3.0 parts |
| N-Methyl-2-pyrrolidone | 3.0 parts |
| 2,4,7,9-Tetramethyl-5-decyne-4,7-diol | 1.0 part |
| Ethylene glycol | 1.0 part |

After the above materials were dispersed, the following components were mixed. Then, the mixture was filtered through a 1-μm membrane filter and then filtered through a 0.45-μm membrane filter to give a recording liquid.

| | |
|---|---|
| The above dispersion | 13.0 parts |
| Dispersing agent ("Solsperse 27000" supplied by Zeneca K.K.) | 0.2 part |
| Acrylic resin emulsion ("W-215" supplied by Nippon Polymer Industry Co., Ltd.) | 1.0 part |
| Diethylene glycol | 22.5 parts |
| Antifungal agent ("Proxel GXL", supplied by Zeneca K.K.) | 0.15 part |
| Ethylenediamine tetraacetic acid sodium salt | 0.02 part |
| 2,4,7,9-Tetramethyl-5-decyne-4,7-diol | 0.1 part |
| Purified water | 63.53 parts |

EXAMPLE 19

A rosin-treated pigment water-based dispersion having a solid content of 50% was obtained in the same manner as in Example 15 except that the insoluble azo pigment in Example 15 was replaced with 280 parts of an isoiondolinone pigment ("Irgadine Yellow 3RLTN" supplied by CIBA). This dispersion was placed in a sand mill together with the following materials and the mixture was dispersed for 3 hours.

| | |
|---|---|
| Yellow pigment (rosin-treated pigment dispersion, product having a solid content of 50%) | 20.0 parts |
| Acrylic resin aqueous solution ("Joncryl 62" supplied by Johnson Polymer Corp.) | 7.0 parts |
| Dispersing agent ("Emulgen A-90" supplied by Kao Corp.) | 4.0 parts |
| Purified water | 74.5 parts |
| Ethylene glycol | 6.0 parts |

After the above materials were dispersed, the following components were mixed. Then, the mixture was filtered through a 1-μm membrane filter and then filtered through a 0.45-μm membrane filter to give a recording liquid.

| | |
|---|---|
| The above dispersion | 13.5 parts |
| Dispersing agent ("Solsperse 27000" supplied by Zeneca K.K.) | 0.2 part |

-continued

| | |
|---|---|
| Acrylic resin emulsion ("W-215" supplied by Nippon Polymer Industry Co., Ltd.) | 1.0 part |
| Glycerin | 25.0 parts |
| Antifungal agent ("Sodium omadine", supplied by Olin Corp.) | 0.15 part |

COMPARATIVE EXAMPLE 11

A water-based dispersion (rosin-treated pigment dispersion) was obtained in the same manner as in Example 15 except that the salt-milling temperature was changed from 50° C. to 120° C. Then, a concentrated inkjet recording liquid was obtained in the same manner as in Example 5. Table 5 shows the evaluation results.

Further, parts of the recording liquids obtained in Examples 13 to 19 were stored at −40 0° C. for 1 week, parts of the recording liquids obtained in Examples 12 to 18 were stored at a constant-temperature chamber at 60° C. for 1 month, and parts of the recording liquids obtained in Examples 12 to 18 were stored at −40 ° C. for 3 hours, temperature-increased to 60° C. over 3 hours, maintained at 60° C. for 3 hours, cooled to −40 ° C. over 3 hours and repeatedly tested in this manner for 3 days. In all of these cases, no precipitate occurred, and all the recording liquids retained their initial viscosities and showed stable ejection properties.

What is claimed is:

1. A water-dispersed inkjet recording liquid containing, as a colorant, a water-based dispersion of an organic pigment (A) which is at least one member selected from the group consisting of a quinacridone pigment, a benzimidazolone pigment, an insoluble azo pigment, a fused azo pigment, a quinophthalone pigment, a naphthol pigment, a perylene pigment and an isoindolinone pigment and has an average particle diameter of 10 to 150 nm measured by laser scattering, the water-based dispersion of the organic pigment (A) being obtained by mechanically kneading a mixture of the organic pigment (A), a water-soluble inorganic salt (B) in an amount by weight at least three times as large as the amount of the organic pigment (A) and a water-soluble solvent (C) at 30 to 65° C. to finely mill the organic pigment (A), and then removing the water-soluble inorganic salt (B) and the water-soluble solvent (C) by washing the kneaded mixture with water.

2. A water-dispersed inkjet recording liquid according to claim 1, wherein the water-based dispersion of the organic pigment (A) is a product obtained by further adding a pigment derivative (D) of the formula (1), $$P\text{---}[X\text{---}Y\text{---}Z\text{---}N(R^1)R^2]_n \qquad (1)$$

wherein P is an organic pigment residue, a heterocyclic ring residue or an aromatic polycyclic compound residue, X is a divalent binding group formed of a chemically rational combination of 2 to 15 atoms

TABLE 5

| | Dispersing time (hour) | | Filterability (l) | | Particle diameter | Viscosity | Printed state | Water resistance | | Trans-parency | Ejection properties |
|---|---|---|---|---|---|---|---|---|---|---|---|
| | SaM | SnM | 1.0 µ | 0.45 µ | nm | CPS | | Dpl | Ims | | |
| Ex. 13 | 3 | 4 | 1 or more | 1.0 | 103 | 1.6 | A | A | A | A | A |
| Ex. 14 | 3 | 4 | 1 or more | 1.0 | 96 | 1.7 | A | A | A | A | A |
| Ex. 15 | 2 | 3 | 1 or more | 0.7 | 97 | 2.5 | A | A | A | A | A |
| Ex. 16 | 3 | 4 | 1 or more | 0.9 | 98 | 1.1 | A | A | A | A | A |
| Ex. 17 | 2 | 3 | 1 or more | 0.8 | 99 | 1.8 | A | A | A | A | A |
| Ex. 18 | 2 | 3 | 1 or more | 0.8 | 102 | 2.7 | A | A | A | A | A |
| Ex. 19 | 2 | 3 | 1 or more | 0.9 | 82 | 2.7 | A | A | A | A | A |
| CEx. 10 | 3 | 4 | 0.8 | 0.4 | 230 | | A | A | A | B | B |
| CEx. 11 | 2 | 3 | 0.9 | 0.3 | 187 | | A | A | A | B | B |

Ex. =Example, CEx. = Comparative Example
Notes:
SaM in Dispersing time: Salt-milling time
SnM in Dispersing time: Time for dispersing with sand mil or paint shaker
Dpl: Water was dropped on recorded product.
Ims: Recorded product was immersed in water.
A: Measurement result was excellent

Industrial Utility

The inkjet recording liquid of the present invention is water-based but remarkably excellent in water resistance and transparency, and it is also excellent in ejection properties. It is therefore suitable for use as an inkjet recording liquid. The inkjet recording liquid of the present invention is suitable for use in the fields of documents preparation in offices, marking in symbols, marking and numbering on corrugated cardboard, recorded products such as bar-codes, and simple printing.

selected from the group consisting of S, C, N, O and H, Y is a divalent binding group selected from the group consisting of a direct bond, —NR— in which R is H or an alkyl group having 1 to 18 carbon atoms, or —O—, Z is an alkylene group having 1 to 6 carbon atoms, either each of $R^1$ and $R^2$ is independently an optionally substituted alkyl group having 1 to 18 carbon atoms or $R^1$ and $R^2$ form a heterocyclic ring which may have a substituent, and n is an integer of 1 to 3, to the mixture, kneading the mixture to finely mill the organic pigment (A), and then removing the water-soluble inorganic salt (B) and the water-soluble solvent (C) by washing the kneaded mixture with water.

3. The water-dispersed inkjet recording liquid according to claim 1, wherein the water-dispersed inkjet recording liquid further contains a water-based resin in addition to the colorant.

4. The water-dispersed inkjet recording liquid according to claim 3, wherein the water-dispersed inkjet recording liquid further contains a neutralizing agent.

5. The water-dispersed inkjet recording liquid according to claim 3, wherein the organic pigment (A) is contained in the range of from 0.1 to 10% by weight.

6. The water-dispersed inkjet recording liquid according to claim 3, wherein the water-dispersed inkjet recording liquid has a viscosity in the range of from 0.8 to 15 centipoise at 25° C.

7. The water-dispersed inkjet recording liquid according to claim 3, wherein the water-based resin is contained in an amount of 0.5 to 10 parts by weight per 100 parts by weight of the recording liquid.

8. The process for the production of a water-dispersed inkjet recording liquid, which comprises the following steps a)–d), a) mechanically kneading a mixture of an organic pigment (A), a water-soluble inorganic salt (B) in an amount by weight at least three times as large as the amount of the organic pigment (A) and a water-soluble solvent (C), to finely mill the organic pigment A), b) removing the water-soluble inorganic salt (B) and the water-soluble solvent (C) from the mixture of the finely milled organic pigment (A) by washing the mixture with water, to obtain a water-based dispersion of the organic pigment (A) having an average particle diameter of 10 to 150 nm measured by laser scattering, c) adding and dispersing a water-based resin to/in the water-based dispersion, and d) adding water and an additive to the dispersion to dilute the dispersion and filtering the diluted dispersion through a filter having an opening diameter of 3 μm or less.

9. A process for the production of an inkjet recording liquid according to claim 8, wherein the mixture in the step a) further contains the pigment derivative (D) of the formula (1), $$P-[X-Y-Z-N(R^1)R^2]_n \qquad (1)$$

wherein P is an organic pigment residue, a heterocyclic ring residue or an aromatic polycyclic compound residue, X is a divalent binding group formed of a chemically rational combination of 2 to 15 atoms selected from the group consisting of S, C, N, O and H, Y is a divalent binding group selected from the group consisting of a direct bond, —NR— in which R is H or an alkyl group having 1 to 18 carbon atoms, or —O—, Z is an alkylene group having 1 to 6 carbon atoms, either each of $R^1$ and $^2$ is independently an optionally substituted alkyl group having 1 to 18 carbon atoms or $R^1$ and $R^2$ form a heterocyclic ring which may have a substituent, and n is an integer of 1 to 3, and/or a resin (E) which is a solid and water-insoluble at room temperature.

10. The process for the production of a water-dispersed inkjet recording liquid according to claim 8, wherein the water-based resin is dispersed in the water-based dispersion in the step c) by kneading the water-based resin and the water-based dispersion.

11. The process for the production of a water-dispersed inkjet recording liquid according to claim 8, wherein, in the step c), the organic pigment has a concentration of 10 to 40% by weight and the organic pigment and the water-based resin are dispersed.

12. A process for the production of a water-dispersed inkjet recording liquid according to claim 8, therein the additive in the step d) contains at least one selected from the group consisting of a neutralizing agent for the water-based resin, a dispersing agent, an aqueous solvent for retaining wettability, an antifungal agent, an agent for adjusting penetration, a chelating agent and an antifoaming agent.

* * * * *